(12) United States Patent
Strehlau et al.

(10) Patent No.: US 6,350,421 B1
(45) Date of Patent: Feb. 26, 2002

(54) NITROGEN OXIDE STORAGE MATERIAL AND NITROGEN OXIDE STORING CATALYST PREPARED THEREFROM

(75) Inventors: Wolfgang Strehlau, Grosskrotzenburg; Ulrich Göbel, Hattersheim; Lothar Mussmann, Offenbach; Rainer Domesle, Alzenau, all of (DE)

(73) Assignee: dmc² Degussa Metals Catalysts Cerdec AG, Frankfurt am Main (DE)

( * ) Notice: Subject to any disclaimer, the term of this patent is extended or adjusted under 35 U.S.C. 154(b) by 0 days.

(21) Appl. No.: 09/378,693

(22) Filed: Aug. 23, 1999

Related U.S. Application Data

(60) Provisional application No. 60/099,661, filed on Sep. 9, 1998.

(30) Foreign Application Priority Data

Aug. 24, 1998 (DE) .......................... 198 38 282

(51) Int. Cl.⁷ .................. B01D 53/92; B01D 53/94; B01J 20/00
(52) U.S. Cl. ................ 423/213.2; 423/213.5; 423/239.1; 502/300; 502/302; 502/304; 502/326; 502/340; 502/344; 502/349; 502/400; 502/514
(58) Field of Search .............. 502/300, 302, 502/304, 326, 340, 344, 400, 514, 349; 423/239.1, 213.5, 213.2

(56) References Cited

U.S. PATENT DOCUMENTS

| | | | |
|---|---|---|---|
| 5,496,788 A | * 3/1996 | Domesle et al. ............. 502/333 |
| 5,712,218 A | * 1/1998 | Chopin et al. ............... 502/304 |
| 5,750,082 A | * 5/1998 | Hepburn et al. ......... 423/213.5 |
| 5,814,577 A | * 9/1998 | Park et al. .................. 502/304 |
| 5,888,464 A | * 3/1999 | Wu et al. ................. 423/213.5 |
| 5,919,727 A | * 7/1999 | Brezny ........................ 502/304 |
| 5,948,376 A | * 9/1999 | Miyoshi et al. .......... 423/213.5 |
| 5,972,830 A | * 10/1999 | Yoshida et al. ............. 502/304 |
| 6,010,673 A | * 1/2000 | Kanazawa et al. ........ 423/213.5 |
| 6,025,297 A | * 2/2000 | Ogura et al. ................ 502/300 |
| 6,051,529 A | * 4/2000 | Brezny ........................ 502/302 |

FOREIGN PATENT DOCUMENTS

| | | |
|---|---|---|
| DE | 197 13 432 A1 | 10/1997 |
| EP | 556554 A2 | 8/1993 |
| EP | 0 645 173 A2 * | 3/1995 |
| EP | 0 653 238 A1 * | 5/1995 |
| EP | 0 657 204 A1 * | 6/1995 |
| EP | 664147 A2 | 7/1995 |
| EP | 0 666 103 A1 * | 8/1995 |
| EP | 0 718 028 A1 * | 6/1996 |
| EP | 0 771 584 A1 * | 5/1997 |
| WO | 9702886 | 1/1997 |
| WO | 9816472 | 4/1998 |

* cited by examiner

*Primary Examiner*—Steven P. Griffin
*Assistant Examiner*—Timothy C Vanoy
(74) *Attorney, Agent, or Firm*—Smith, Gambrell & Russell, LLP

(57) ABSTRACT

A nitrogen oxide storage material is disclosed which contains at least one storage component for nitrogen oxides in the form of an oxide, mixed oxide, carbonate or hydroxide of the alkaline earth metals magnesium, calcium, strontium and barium and the alkali metals potassium and caesium on a high surface area support material. The support material can be doped cerium oxide, cerium/zirconium mixed oxide, calcium titanate, strontium titanate, barium titanate, barium stannate, barium zirconate, magnesium oxide, lanthanum oxide, praseodymium oxide, samarium oxide, neodymium oxide, yttrium oxide, zirconium silicate, yttrium barium cuprate, lead titanate, tin titanate, bismuth titanate, lanthanum cobaltate, lanthanum manganate and barium cuprate or mixtures thereof.

24 Claims, 9 Drawing Sheets

NITROGEN OXIDE STORAGE MATERIAL AND NITROGEN OXIDE STORING CATALYST PREPARED THEREFROM

This application claims the benefit of U.S. Provisional Application No. 60/099,661, filed Sep. 9, 1998.

INTRODUCTION AND BACKGROUND

The present invention relates to a nitrogen oxide storage material which contains at least one storage component for nitrogen oxides in the form of an oxide, carbonate or hydroxide of an alkaline earth metal selected fro the group consisting of magnesium, calcium, strontium and barium and an alkali metal selected from the group consisting of potassium and cesium on a support material.

In the gasoline engine sector, so-called lean engines have been developed to reduce the consumption of fuel. These engines operate with lean air/fuel mixtures when not operating under full load. A lean air/fuel mixture contains a higher oxygen concentration than is required for complete combustion of the fuel. In the corresponding exhaust gas the oxidizing components oxygen ($O_2$) and nitrogen oxides ($NO_x$) are then present in an excess as compared with the reducing exhaust gas components carbon monoxide (CO), hydrogen ($H_2$) and hydrocarbons (HC). Lean exhaust gas usually contains 3 to 15 vol. % of oxygen. However, when operating under full or relatively full load, even lean operating gasoline engines have a stoichiometric ratio or even less than stoichiometric ratio, that is to say a rich, air/fuel composition.

Diesel engines on the other hand operate under all conditions with well above stoichiometric air to fuel mixtures.

Due to the high oxygen content of exhaust gas from lean engines or diesel engines, the nitrogen oxides contained therein cannot be reduced, as is the case with stoichiometrically operated gasoline engines, by using so-called three way catalytic converters with simultaneous oxidation of hydrocarbons and carbon monoxide to yield nitrogen.

To remove nitrogen oxides from these exhaust gases, therefore, nitrogen oxide storing catalysts have been produced which store the nitrogen oxides contained in lean exhaust gas in the form of nitrates.

The mode of operation of nitrogen oxide storing catalysts is described in detail in SAE 950809 which is incorporated herein by reference. Accordingly, nitrogen oxide storing catalysts consist of a catalyst material which is generally applied in the form of a coating on an inert honeycomb structure made of ceramic or metal, a so-called carrier structure. The catalyst material contains the nitrogen oxide storage material and a catalytically active component. The nitrogen oxide storage material thus consists of the actual nitrogen oxide storage component which is deposited onto a support material in highly dispersed form.

The basic oxides of alkali metals, alkaline earth metals and rare earth metals, preferably barium oxide, are used as storage components which react with nitrogen dioxide to give the corresponding nitrates. It is known that these oxide materials are largely present, in the presence of air, in the form of carbonates and hydroxides. These compounds are also suitable for storing nitrogen oxides. When therefore in the context of the invention the term "basic storage oxides" is referred to, then this expression is intended to also include the corresponding carbonates and hydroxides.

The noble metals from the platinum group of metals from the Periodic Table of Elements are generally used as catalytically active components and these are generally deposited on to the support material together with the storage component. Active, high surface area aluminum oxide is generally used as support material as is well known in this art.

The task of the catalytically active component is to convert carbon monoxide and hydrocarbons in lean exhaust gas to carbon dioxide and water. In addition they should oxidize any nitrogen monoxide in the exhaust gas to nitrogen dioxide so that it can react with the basic storage material to give nitrates. With increasing incorporation of nitrogen oxides in the storage material the storage capacity of the material decreases and it therefore has to be regenerated from time to time. For this purpose, the engine is operated for short periods with a stoichiometric composition or a rich air/fuel mixture. Under the reducing conditions in a rich exhaust gas the nitrates which have been produced decompose to give nitrogen oxides $NO_x$ and are reduced to nitrogen, with the production of water and carbon dioxide, by using carbon monoxide, hydrogen and hydrocarbons as reducing agents. The storing catalyst operates as a three way catalytic converter during this operating phase.

A substantial problem with storage materials is their inadequate resistance to ageing at high temperatures. As pointed out in SAE Technical Paper 970746, an important ageing mechanism for nitrogen oxide storage materials comprises the actual storage component reacting with the support material. Thus, when a storage material consisting of barium oxide on zirconium oxide was aged for a period of 24 hours at 750° C. the production of barium zirconate $BaZrO_3$ was observed. Barium oxide on titanium oxide led to the production of barium titanate. In both cases this reaction of storage component with support material was associated with a high loss of nitrogen oxide storage capacity. Zirconium oxide and titanium oxide are thus unsuitable as supports for alkali metal and alkaline earth metal storage components due to their high tendency to react with barium oxide when they are subjected to high temperatures during use. Aluminum oxide behaved somewhat better as a support material, but even here the production of barium aluminate occurred with long term ageing at high temperatures.

Various combinations of storage components and support materials which are also intended to solve this ageing problem have been disclosed in the patent literature. Thus, EP 0 562 516 A1 describes a catalyst consisting of barium oxide, lanthanum oxide and platinum on a support material made of aluminum oxide, zeolite, zirconium oxide, aluminum silicate or silicon dioxide, wherein at least some of the barium oxide and lanthanum oxide form a mixed oxide. By virtue of this mixed oxide the production of lanthanum aluminate, which would otherwise lead to ageing of the catalyst, is intended to be suppressed.

In order to suppress the reaction of storage components with a support consisting of aluminum oxide EP 0 645 173 A2 proposes dissolving lithium in the support in such a way that a solid solution of aluminum oxide and lithium is formed.

EP 0 653 238 A1 suggests as support material, titanium oxide which contains at least one element selected from the group of alkali metals, alkaline earth metals and rare earth metals in the form of a solid solution.

EP 0 657 204 A1 discloses the mixed oxides $TiO_2$—$Al_2O_3$, $ZrO_2$—$Al_2O_3$ and $SiO_2$—$Al_2O_3$ as support materials for nitrogen oxide storing catalysts. In addition, mixed oxides of $TiO_2$, $Al_2O_3$ with alkaline earth metals and rare earth metals, in particular $TiO_2$—$Al_2O_3$—$Sc_2O_3$, $TiO_2$—

Al$_2$O$_3$—Y$_2$O$_3$, TiO$_2$—Al$_2$O$_3$—La$_2$O$_3$ and TiO$_2$—Al$_2$O$_3$—Nd$_2$O$_3$ are mentioned as support materials.

EP 0 666 103 A1 describes a catalyst which contains a nitrogen oxide storage component and a noble metal on a porous support material. Aluminum oxide, zeolite, zirconium oxide, aluminum silicate and silicon dioxide are suggested as support material. The nitrogen oxide storage component and noble metal are deposited onto these support particles in very close association. In addition, the catalyst may also contain cerium oxide as an oxygen storage component, wherein cerium oxide is kept separate from the noble metal and thus also from the storage component.

EP 0 718 028 A1 discloses a thermally resistant nitrogen oxide storage material. The high thermal resistance is obtained by finely dispersing the nitrogen oxide storage component in the support material. For this purpose, a solution of a compound of at least one alkali metal, one alkaline earth metal and one rare earth metal is mixed with a solution of an oxide sol of at least one metal selected from Groups IIIb, IVa and IVb of the Periodic Table of Elements, and converted into a gel, dried and calcined. The resulting storage material is amorphous. In the examples this storage material is combined inter alia with a catalyst powder which contains platinum on a high surface area cerium/zirconium mixed oxide. The cerium/zirconium mixed oxide thus forms the support material for the platinum component in this case.

EP 0 771 584 A1 also describes a thermally resistant support material for catalysts which also consists of an amorphous mixed oxide. The amorphous mixed oxide is composed of a nitrogen oxide storage component selected from the group of alkali metals, alkaline earth metals and rare earth metals and also of aluminum oxide and at least one oxide selected from the group of titanium oxide, zirconium oxide and silicon dioxide. The aluminum oxide is an important constituent of the amorphous mixed oxide and is present in a molar ratio of 4 to 12 compared with the storage component. The support material may also contain cerium oxide as an oxygen storing material. Cerium oxide and nitrogen oxide storage components may only be present in a molar ratio to each other between 0.5 and 3 in the support material. Outside these limits the thermal resistance is impaired according to data from EP 0 771 584 A1.

WO 97/02886 describes a nitrogen oxide storing catalyst in which the storage component and the catalytically active component are spatially separated from each other but located adjacent to each other. For this purpose, storage component and catalytic component are applied in two superimposed layers on a support structure. Alternatively, storage component and catalytic component may be deposited on different support particles which are then applied together in the form of a coating on the carrier structure. Metal oxides, metal hydroxides, metal carbonates and metal mixed oxides are described as storage materials. The metals may be lithium, sodium, potassium, rubidium, caesium, magnesium, calcium, strontium or barium.

The storage material in accordance with WO 97/02886 may contain a sulfur absorbing component, preferably cerium oxide, to prevent poisoning by sulfur. This cerium oxide may be present in the form of particles alongside the particles of the storage material or be dispersed in the nitrogen oxide storage component.

None of the proposed solutions described above provides nitrogen oxide storage materials with adequate resistance to ageing. Rather, in the case of all known storage materials, deactivation of the alkali metal and alkaline earth metal oxides which store nitrogen oxides takes place due to irreversible reaction with the support materials to give the corresponding aluminates, zirconates, silicates, titanates etc. at elevated temperatures (>=700° C.). And then, the alkali metal and alkaline earth metal oxides are no longer capable of storing nitrogen oxides due to the loss of basicity which results. Since the storage components are generally present in a molar excess as compared with the support oxide, the storage components can react completely to produce a mixed oxide with the support oxide, depending on the time, the exhaust gas composition and the exhaust gas temperature.

German patent publication DE 197 13 432A1 describes a catalytic base material for an exhaust gas purification catalyst which is obtained by impregnating cerium oxide with a solution containing barium and calcining the cerium oxide particles at a temperature from 400 to 1100° C. to form barium oxide at the surface of the cerium oxide particles. According to this document the mixture of barium oxide and cerium oxide particles is calcined at a relatively high surface of the cerium oxide particles. For that purpose temperatures of from 800 to 1100° C. are very effective. Preferably the cerium oxide particles are calcined at 900° C. for a period of 24 hours. This produces particles of barium oxide with a particle size between 7 and 14 $\mu$m. At a calcination temperature of 200° C. the mean particle size is still 1.9 $\mu$m.

The catalytic base material according to DE 197 13 432A1 is used for the manufacture of a catalyst which is especially effective for purification of the exhaust gas of lean burn combustion engines. Therefore, this catalyst is a so-called lean-NO$_x$ catalyst which is able to reduce nitrogen oxides to nitrogen in a lean exhaust gas provided the exhaust gas contains a sufficient amount of reductive exhaust gas components (carbon monoxide and hydrocarbons). The catalytic base material is said to enhance the temperature stability of the catalyst. Nothing is said in DE 197 13 432A1 about the nitrogen oxides storage capability of the catalytic base material.

Accordingly, it is an object of the present invention to provide a nitrogen oxide storage material which is characterized by a high degree of storage efficiency and also substantially improved resistance to ageing.

Another object of the invention is to provide for preparing the storage material and a process to prepare a nitrogen oxide store on an inert support prepared from the storage material.

A further object is to prepare a nitrogen oxide storing catalyst by combining the storage material with noble metals from the platinum group of the Periodic Table of Elements.

A still further object of the present invention is to treat exhaust gas from lean operating internal combustion engines using the nitrogen oxide store and the storing catalyst.

SUMMARY OF THE INVENTION

The above and other objects can be achieved by a nitrogen oxide storage material which contains at least one storage component for nitrogen oxides in the form of particles of an oxide, carbonate or hydroxide of an alkaline earth metal selected from the group consisting of magnesium, calcium, strontium and barium and an alkali metal selected from the group consisting of potassium and cesium on a support material.

The nitrogen oxide storage material is characterized in that the support material is selected from the group consisting of doped cerium oxide, cerium/zirconium mixed oxide, calcium titanate, strontium titanate, barium titanate, barium stannate, barium zirconate, magnesium oxide, lanthanum oxide, praseodymium oxide, samarium oxide, neodymium oxide, yttrium oxide, yttrium barium cuprate, lead titanate, tin titanate, bismuth titanate, lanthanum cobaltate, lanthanum manganate, barium cuprate and mixtures thereof. In addition, the particles of the nitrogen oxide storage components have a mean particle diameter of less than 1.5 μm. The support materials to be used can be divided into four groups. The first group includes support materials based on cerium oxide. These may be doped cerium oxide or cerium/ zirconium mixed oxides. Independently of the type of preparation, these materials have a largely crystalline structure, and are thus not amorphous.

The second group includes stoichiometrically composed mixed oxides comprising the oxides of the storage components and support oxides. Barium titanate may be mentioned as an example as a mixed oxide of barium oxide and titanium oxide. This group thus includes calcium titanate, strontium titanate, barium titanate, barium stannate and barium zirconate.

The third group comprises the pure oxides magnesium oxide, lanthanum oxide, praseodymium oxide, samarium oxide, neodymium oxide and yttrium oxide.

The fourth group comprises the other mixed oxides, yttrium barium cuprate, lead titanate, tin titanate, bismuth titanate, lanthanum cobaltate, lanthanum manganate and barium cuprate.

It has been found that an active and ageing-resistant storage material is obtained when the support material used for the storage component has only a low or zero tendency to react with the storage component and is also stable under the alternating lean and rich exhaust gas compositions of lean engines; that is, the specific surface area of the support materials should be largely stable under the actual exhaust gas conditions of lean engines.

BRIEF DESCRIPTION OF DRAWINGS

The present invention will be further understood with reference to the accompanying drawings, wherein.

DETAILED DESCRIPTION OF INVENTION

Figure 1:
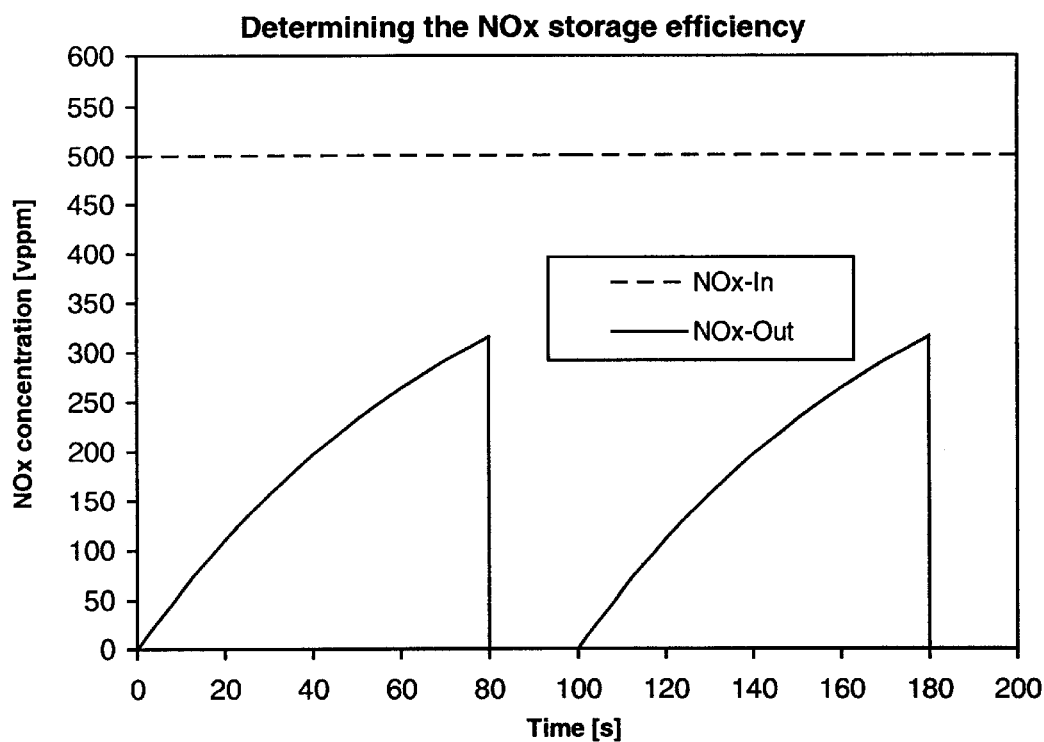
FIG. 1 is a schematic diagram of the NO$_x$ concentrations upstream and downstream of the nitrogen oxide store in order to determine the efficiency of the store.
Figure 2:
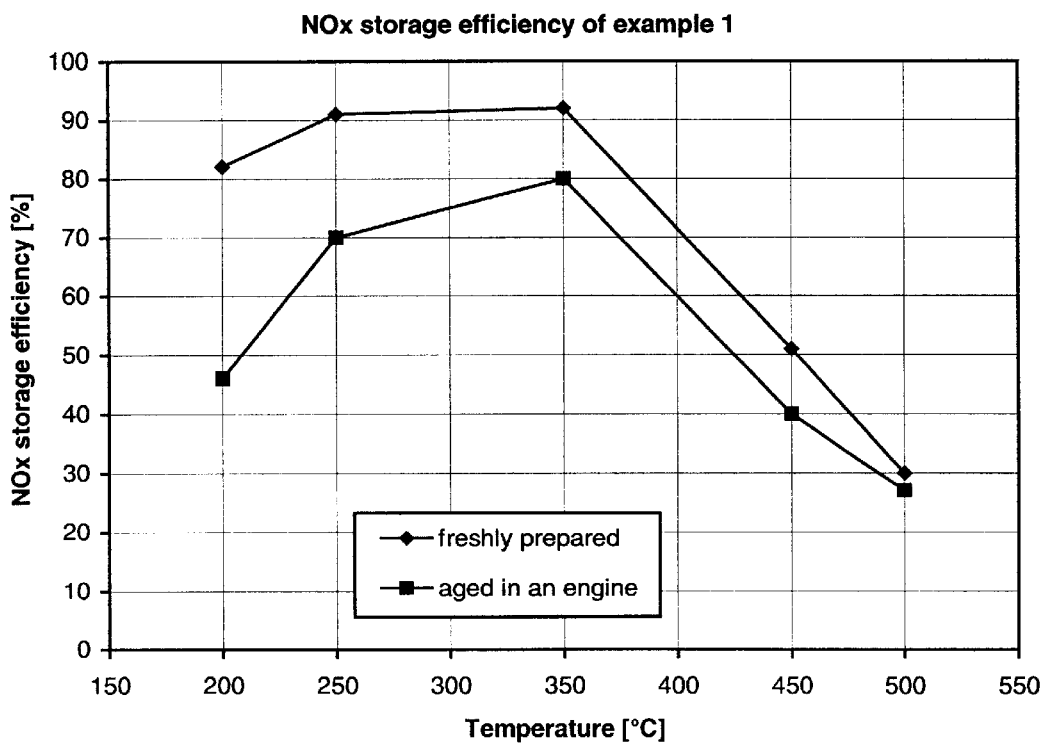
FIGS. 2 to 18 are a series of graphs representing nitrogen oxide/efficiency of storage of the storing catalysts from a few examples and comparison examples as a function of the exhaust gas temperature; for fresh catalysts and catalysts which have been aged in an engine, respectively.
Figure 3:
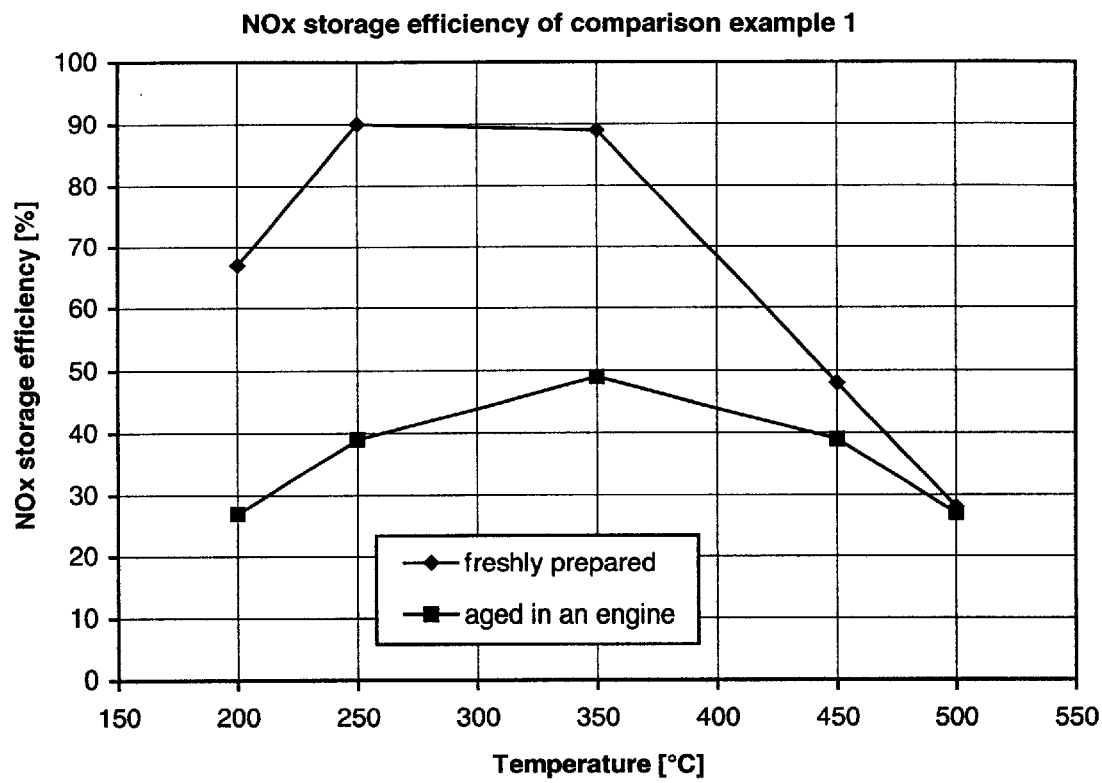
Figure 4:
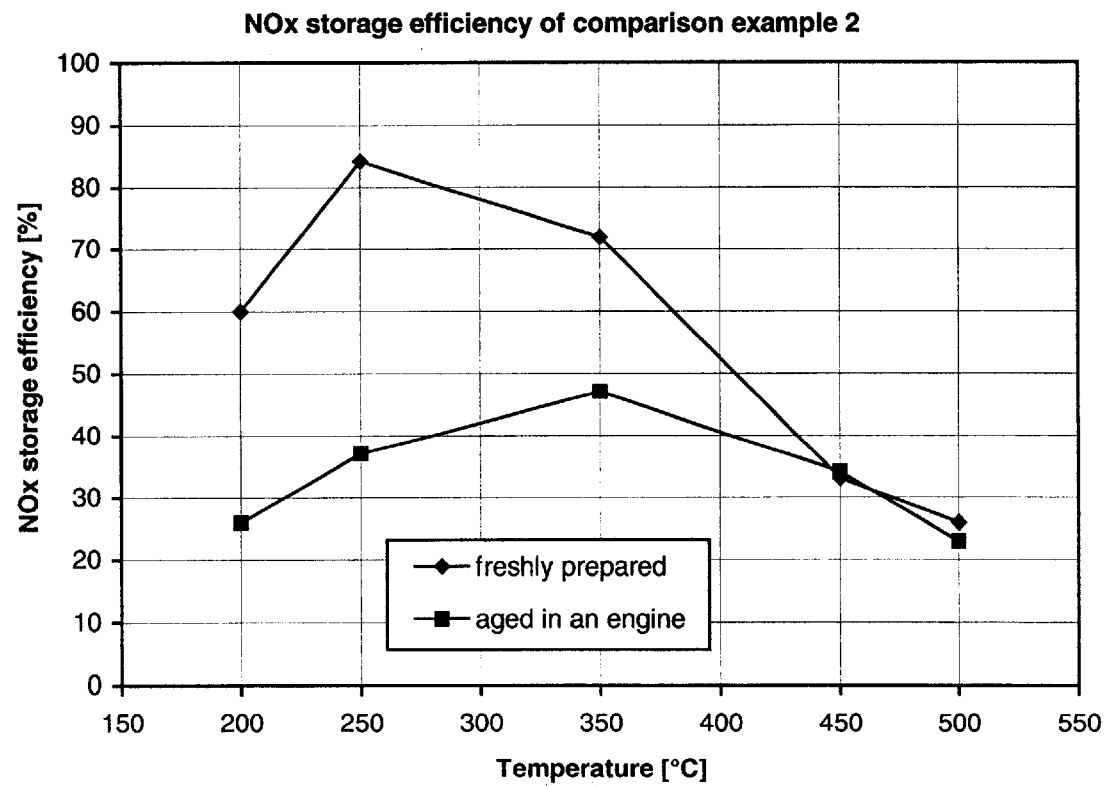
Figure 5:
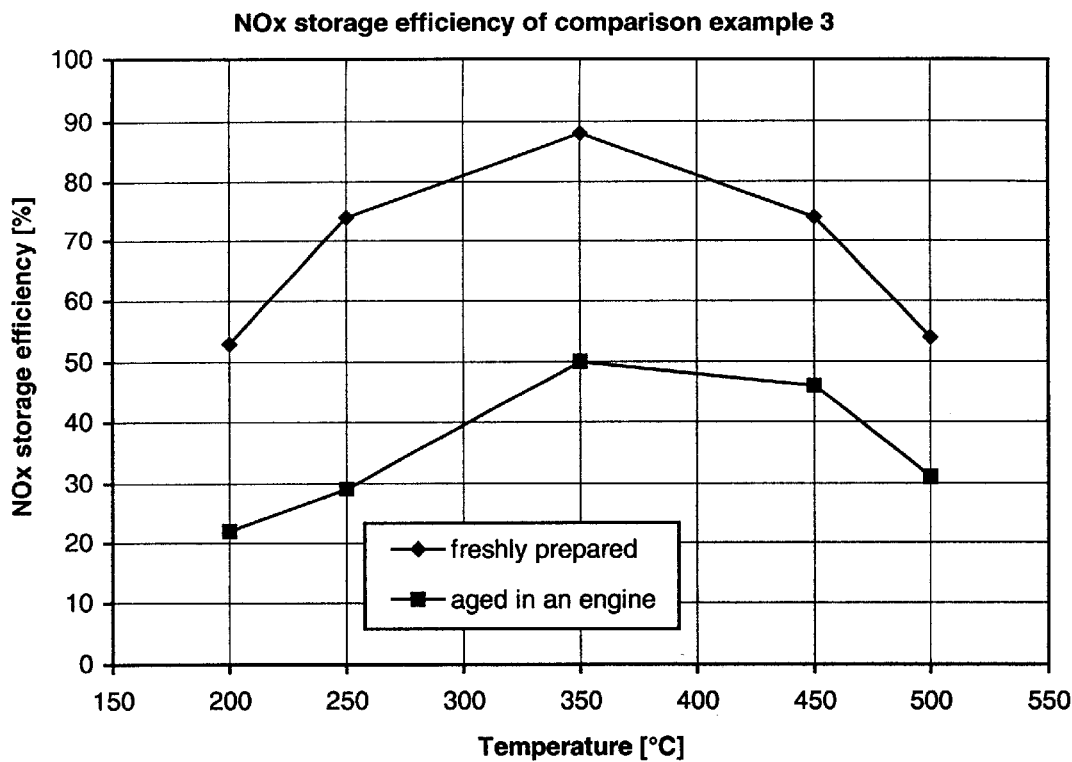
Figure 6:
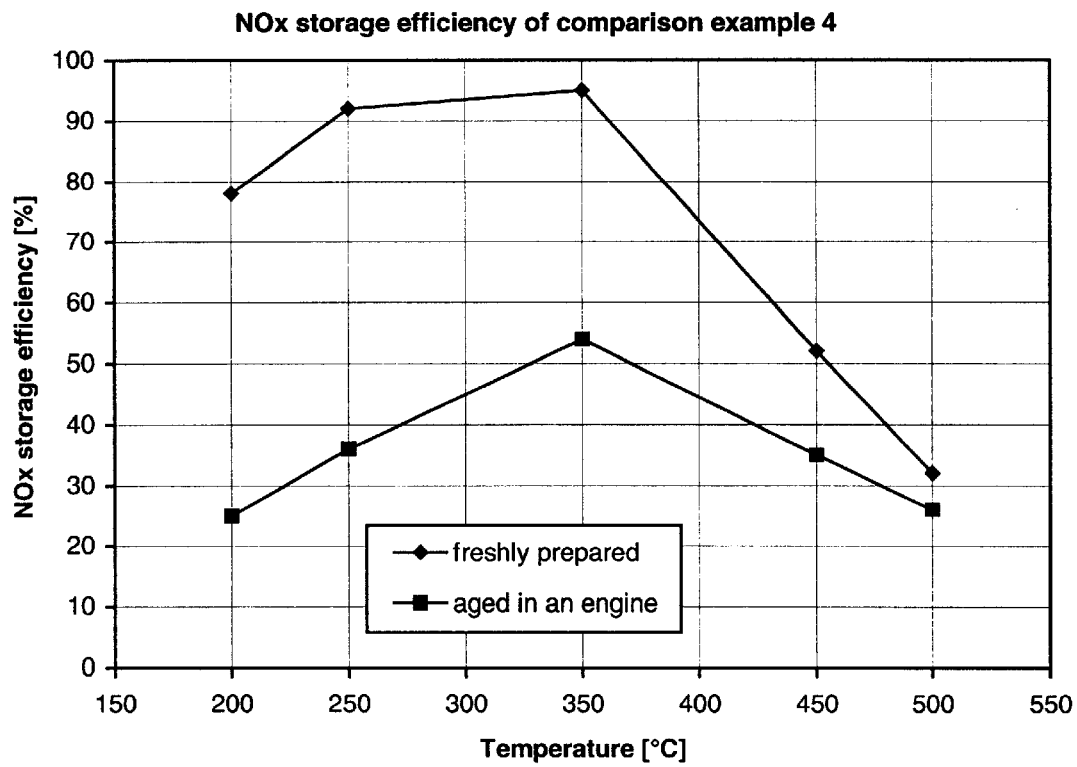
Figure 7:
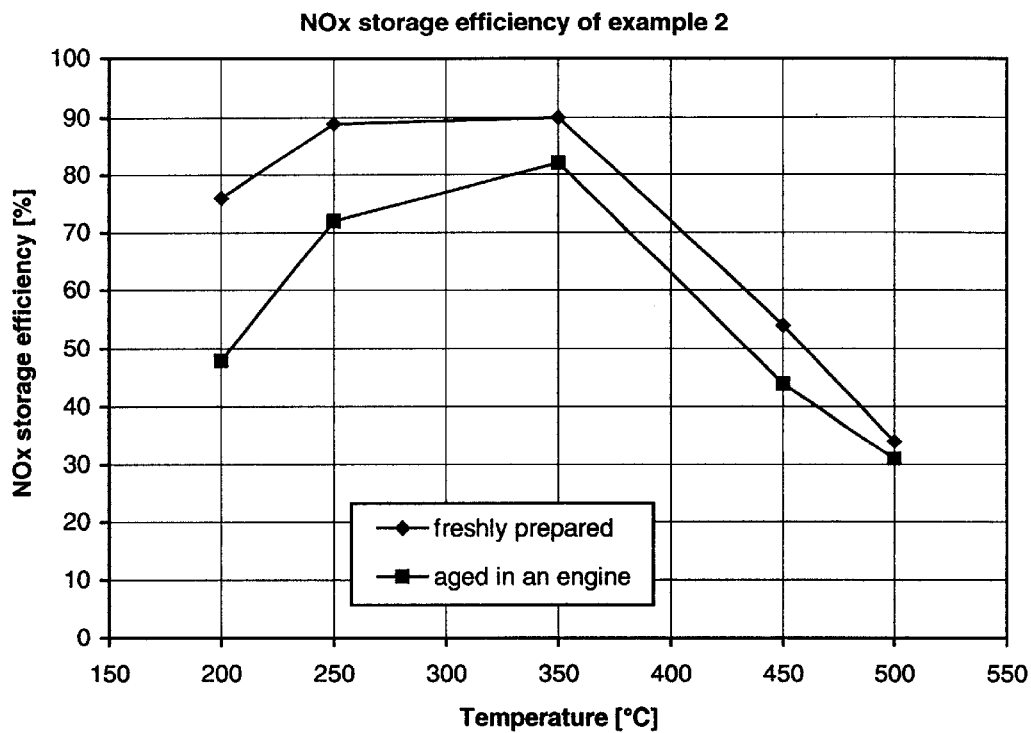
Figure 8:
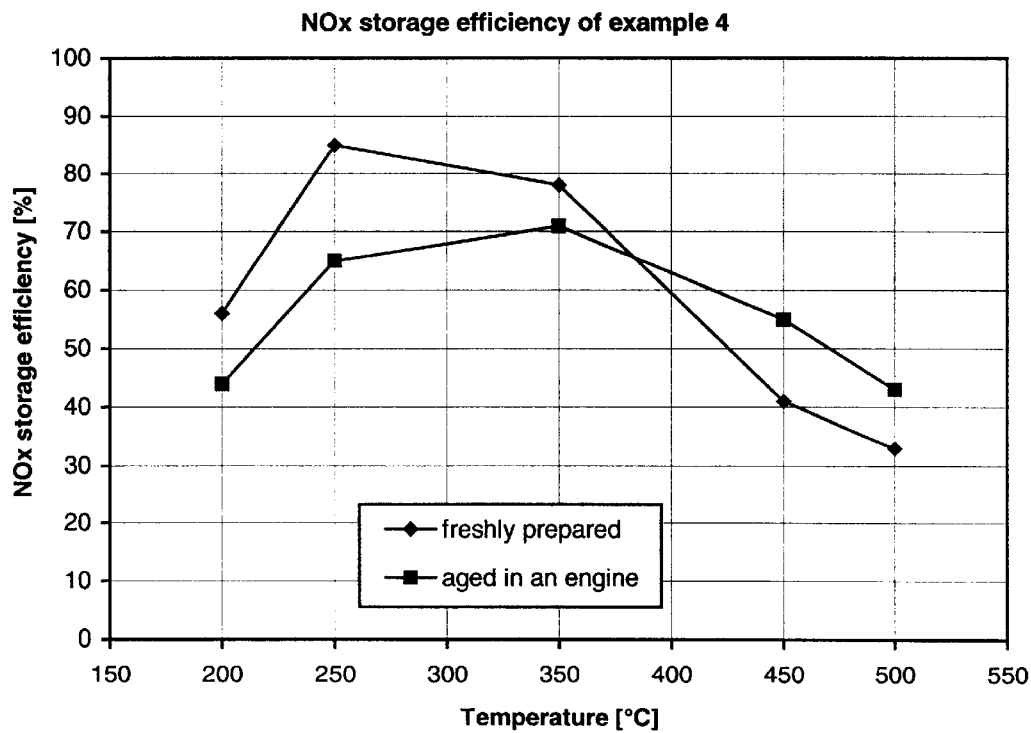
Figure 9:
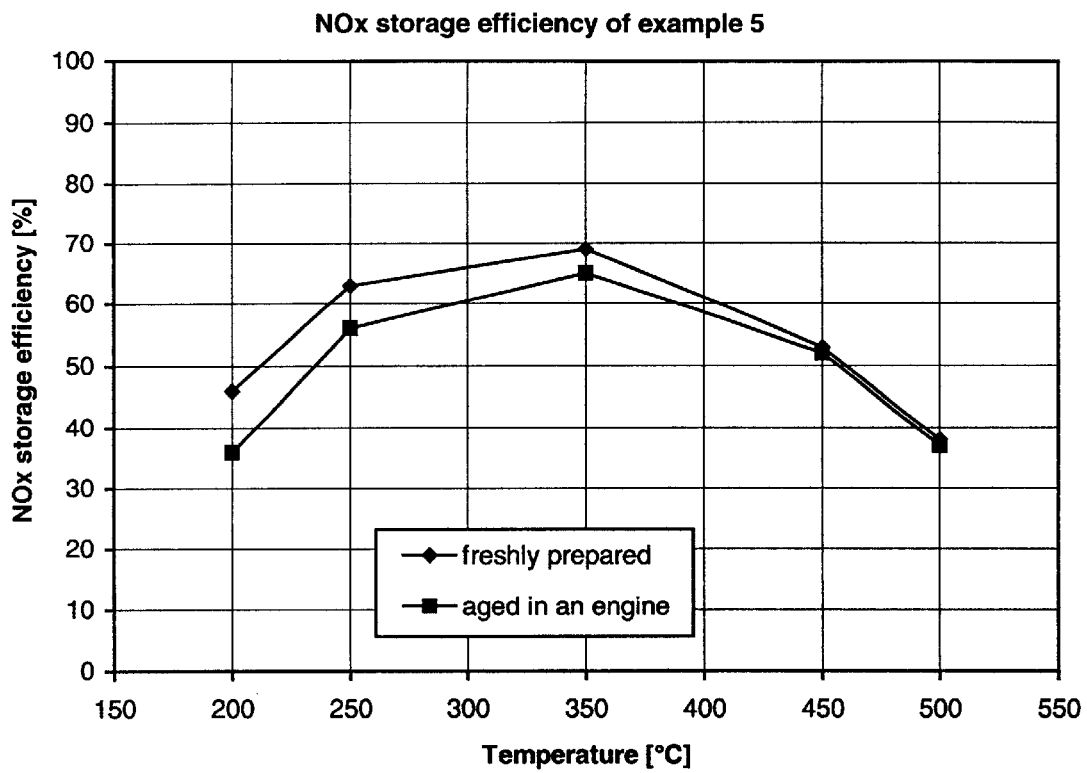
Figure 10:
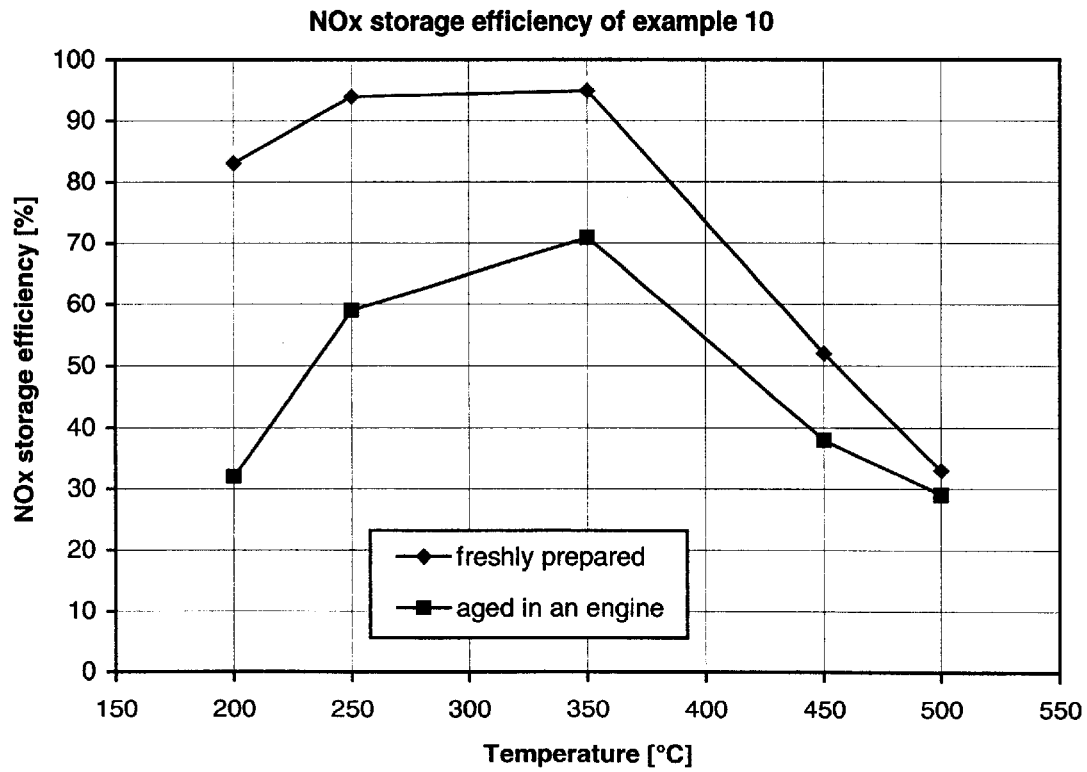
Figure 11:
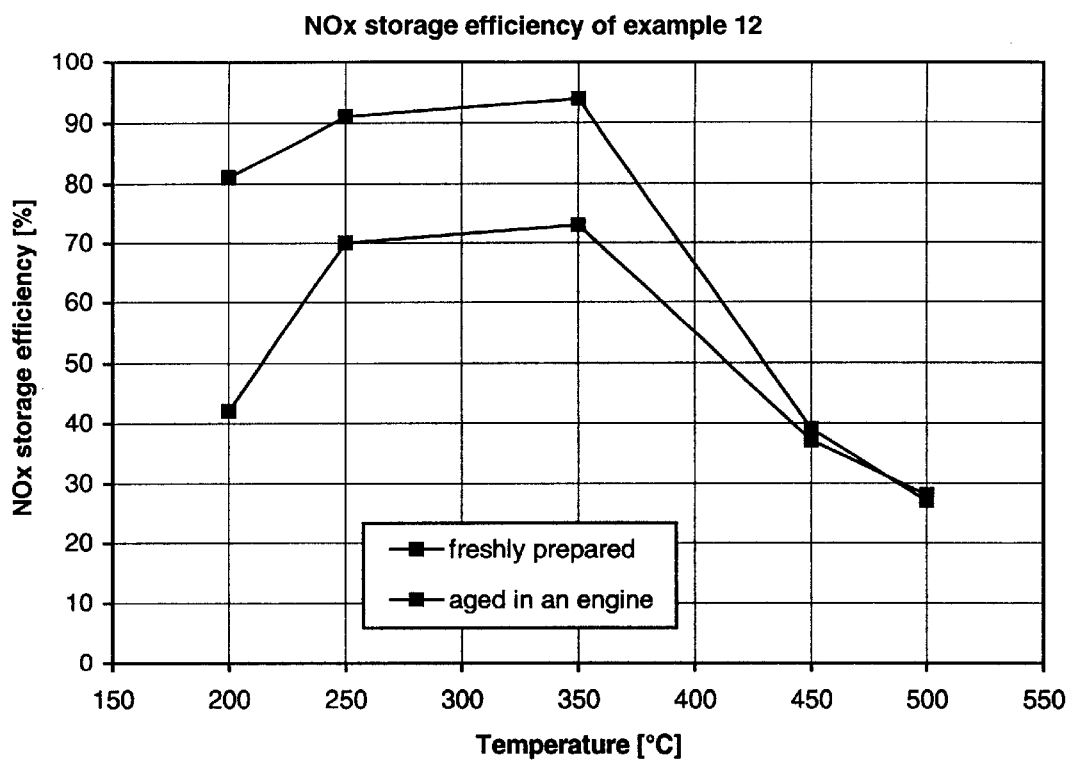
Figure 12:
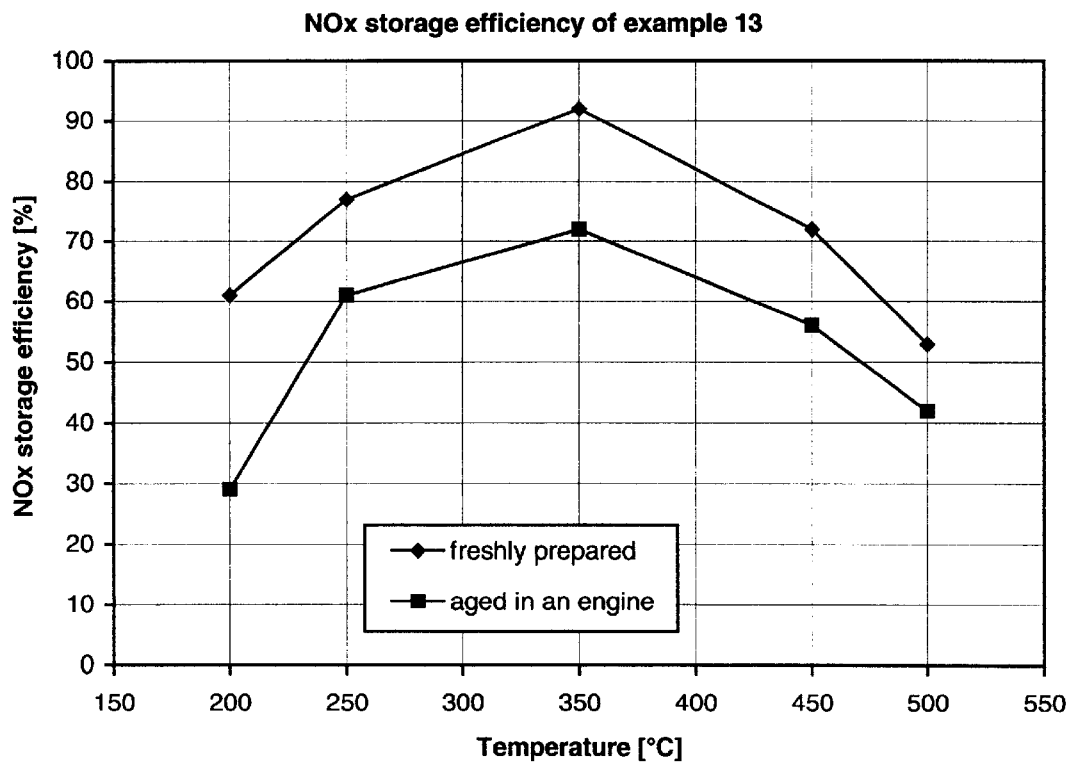
Figure 13:
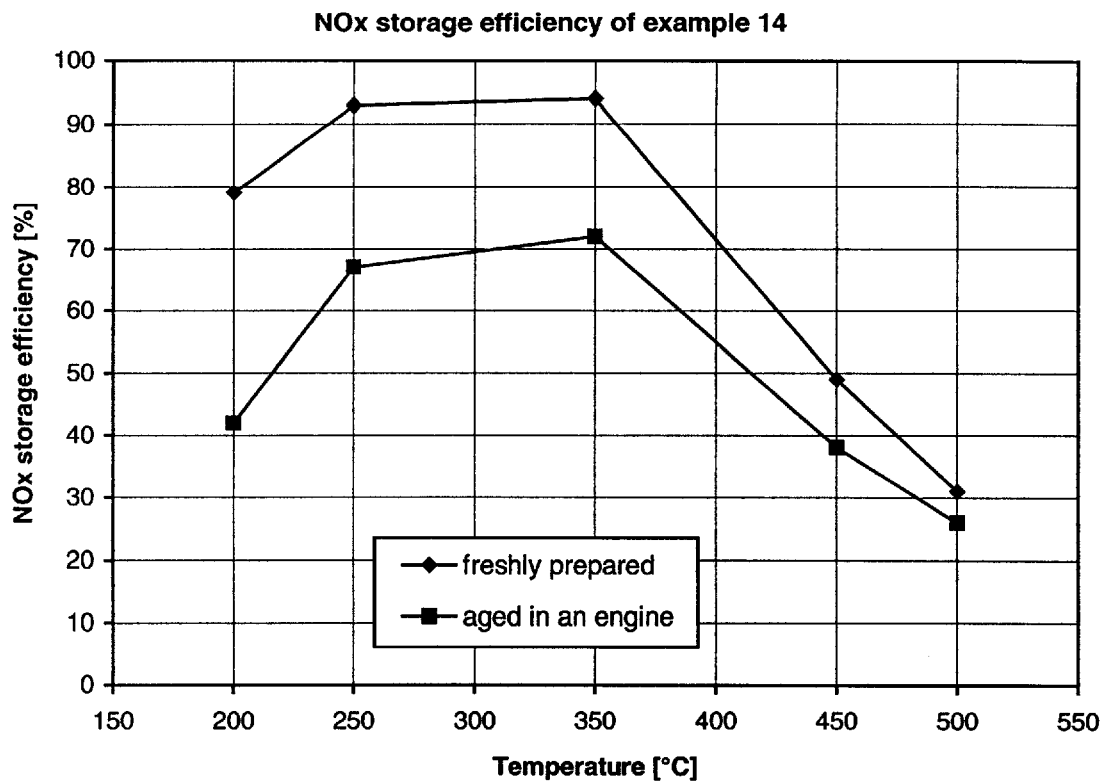
Figure 14:
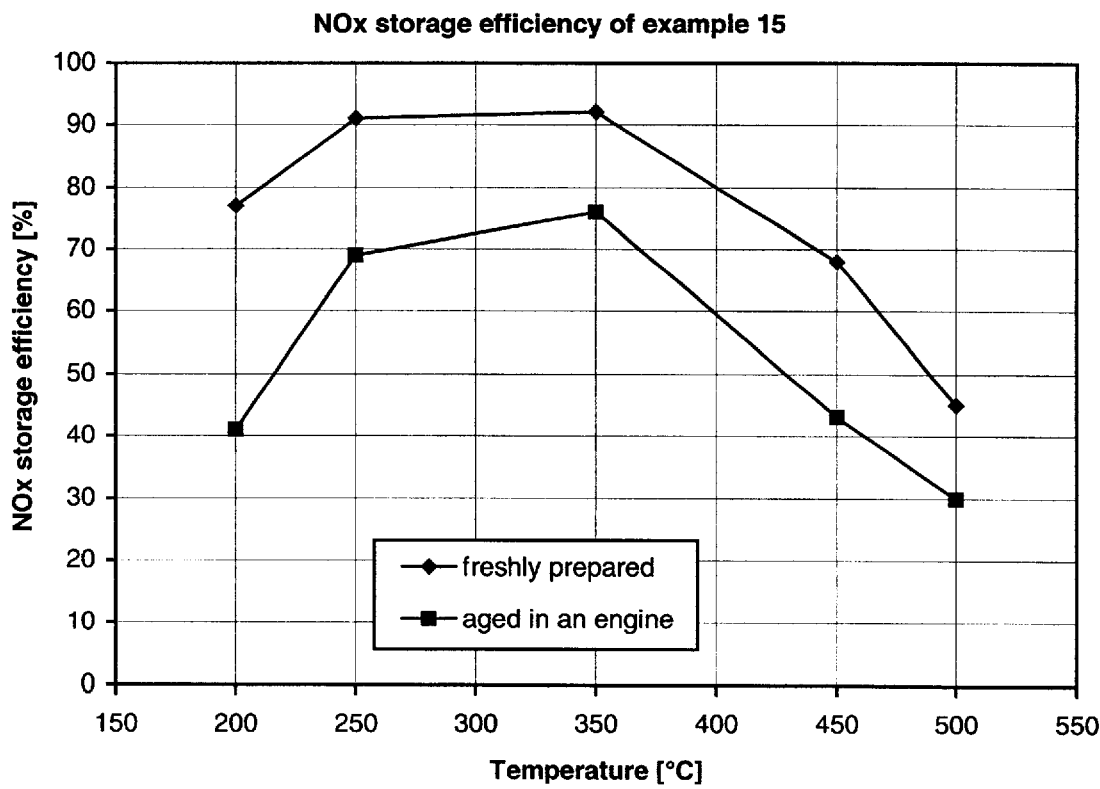
Figure 15:
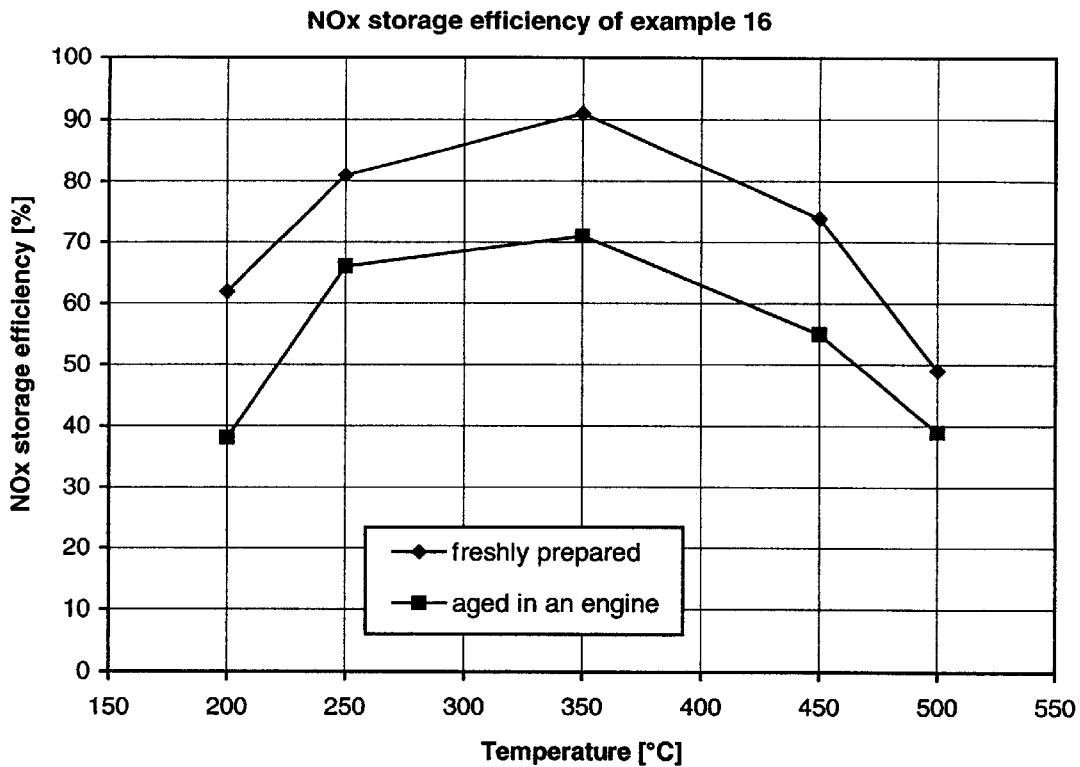
Figure 16:
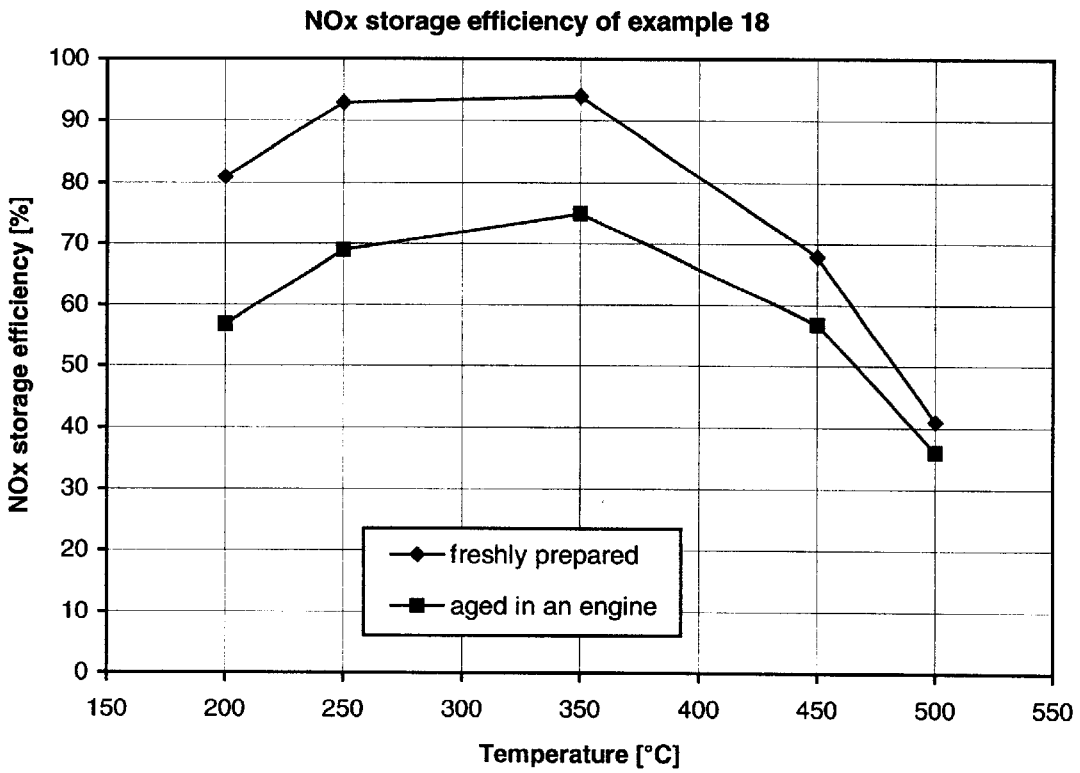

The present invention will now be described in further detail. The theoretical storage capacity of the storage material is produced from the molar amount of storage components with which the support material is loaded. This maximum storage capacity can be better utilized the more finely the storage component is deposited on the support material. It is therefore recommended that a support material with a high specific surface area be chosen, onto which the storage components may be deposited in highly dispersed form.

For use as nitrogen oxide storage materials, loading the support material with 10 to 45, preferably 20 to 30 wt. % of the storage components, with respect to the total weight of storage material, is desirable. Depending on the actual amount used, the support material should therefore have a specific surface area of more than 10, preferably more than 50 m$^2$/g (measured as in DIN 66132). Its total pore value consisting of mesopores (pore diameter d=2 to 30 nm) and macropores (pore diameter d>30 nm) should be greater than 0.1, preferably greater than 0.3 ml/g.

As demonstrated by studies using X-ray diffraction, the support materials mentioned exhibit only a small tendency to react with the storage components. In addition, they can be obtained with specific surface areas greater than 10 m$^2$/g which then leads to adequate stability under the exhaust gas conditions of lean engines. This applies in particular to doped cerium oxide, cerium/zirconium mixed oxides and magnesium oxide.

The size of the fresh surfaces of these materials depends very much on the method of preparation of the materials, thermal pre-treatment and optionally doping with other elements. For example, high surface area magnesium oxide can be obtained from the thermal decomposition of magnesium carbonate, with resulting surface areas greater than 100 m$^2$/g or also as a sintered material with surface areas less than 2 m$^2$/g. The sintered material is not suitable for the purposes of the invention.

Pure cerium oxide can be obtained with high specific surface areas of more than 100 m$^2$/g. After calcination in air at temperatures of 900° C. for a period of 10 hours, these materials still have specific surface areas of more than 10 m$^2$/g. Calcination under reducing conditions at high temperatures, such as occur typically under high load operation of all current gasoline and lean engines, on the other hand, leads to specific surface areas of less than 10 m$^2$/g. Pure cerium oxide is thus less suitable as a support material for the storage components.

The specific surface area of cerium oxide can be stabilized by doping with an oxide of elements selected from the group consisting of silicon, scandium, yttrium and the rare earth metals (lanthanum, praseodymium, neodymium, promethium, samarium, europium, gadolinium, terbium, dysprosium, holmium, erbium, thulium, ytterbium and lutetium) or mixtures of their oxides, even under reducing exhaust gas conditions. For this purpose, 0.5 to 20, preferably 5 to 10 wt. % of the particular oxide or oxide mixture is required. The concentration data cited here refer to the total weight of support material. Doping can be achieved by conventional processes such as for example, co-precipitation, co-thermal hydrolysis, impregnation and precipitation.

Thus, doped cerium oxide can be obtained by co-precipitation from an aqueous solution of precursor compounds of cerium oxide and the doping oxide. For example cerium oxide doped with praseodymium can be prepared by adding ammonium carbonate or ammonium oxalate to an aqueous solution of cerium nitrate and praseodymium nitrate so that cerium and praseodymium are precipitated together as carbonates or oxalates. After filtering and drying, the precipitate is converted into the corresponding oxides by calcination. Alternatively, co-precipitation can also be performed in a basic medium.

In the case of co-thermal hydrolysis, water is removed from a sol consisting of cerium hydroxynitrate and the hydroxynitrate of the doping element by supplying heat. The hydroxynitrates are thereby decomposed to give the corresponding oxides. Co-thermal hydrolysis is described for example in WO 98/16472.

To dope cerium oxide by impregnation, the cerium oxide, present as a powdered material, is soaked with an aqueous solution of precursor compounds of the required doping oxides. Frequently, so-called pore volume impregnation is used in which the precursor compounds of the doping oxides are dissolved in a volume of water which corresponds to the water absorption capacity of the cerium oxide powder.

When doping cerium oxide by precipitation, the cerium oxide is dispersed as a powdered material in an aqueous solution of the precursor compounds of the doping elements. By slow addition of a base, the storage components are precipitated in the form of hydroxides onto the support material.

From the discussed processes co-precipitation and co-thermal hydrolysis are most preferred. They yield a very homogenous doping over the entire cross section of the cerium oxide particles.

In all four processes the precursor compounds or their barely soluble precipitates are converted into the corresponding oxides by calcination at temperatures of up to 800° C.

Suitable support materials for the storage components are also cerium/zirconium mixed oxides, although zirconium oxide as the only support material cannot be used because it reacts for example with barium oxide to give barium zirconate. This reaction is greatly reduced when present as a component in a mixed oxide with cerium oxide because the cerium oxide masks the zirconium oxide and thus largely suppresses any reaction of zirconium oxide with barium oxide.

Cerium/zirconium mixed oxides can be commercially obtained with a wide mixing ratio of cerium oxide to zirconium oxide and also, like pure cerium oxide, are widely used as oxygen storage materials in conventional three-way catalytic converters. Cerium/zirconium mixed oxides may be prepared for example by mechanical mixing or impregnation and co-precipitation methods. Within the context of the present invention the outstanding properties of these materials as support materials are important in the case of the storage components. Their oxygen storage capacity is of less importance.

The cerium/zirconium mixed oxides have particularly beneficial properties as support materials for storage components when the concentration of zirconium oxide in the mixed oxide does not exceed 25, preferably 20 wt. %, with respect to the total weight of mixed oxide. In order to provide the cerium oxide with adequate stability under reducing exhaust gas conditions, the concentration of zirconium oxide in the mixed oxide, however, should not be less than 1 wt. %. Zirconium oxide concentrations between 5 and 15 wt. % are particularly advantageous. Very good results can be obtained with a concentration of 10 wt. % of zirconium oxide. If there is more than 25 wt. % of zirconium oxide present, the cerium oxide is no longer able to shield the zirconium oxide from reaction with the storage components at high temperatures. A cerium/zirconium mixed oxide with 30 wt. % of zirconium oxide is therefore no longer suitable as support material for the storage components under operating conditions with high exhaust gas temperatures.

The prior art mentioned at the beginning frequently also mentions rare earth metal oxides as nitrogen oxide storage components. However, it was found that the cerium oxide used in the storage materials according to the invention has at best a low fraction of the storage capacity in the storage components so that classification of the cerium oxide as a support material in the context of this invention is justified. This is also the case when it is taken into account that, in the storage material according to the invention, the support material is present in a high molar excess as compared with the storage component.

Molar ratios of support material to storage component of 2:1 to 25:1 may be used. Molar ratios larger than 25:1 are not recommended because the storage capacity of the storage material is then too low for industrial applications. With a ratio of less than 2:1, on the other hand, the storage material can no longer be deposited in a sufficiently highly dispersed form on the support material. Molar ratios of 3.5:1 to 6:1 are therefore preferred.

Further improvement in the thermal surface stability of cerium/zirconium mixed oxides can be obtained, as in the case of pure cerium oxide, by doping with an oxide of elements from the group comprising silicon, scandium, yttrium and the rare earth metals (lanthanum, cerium, praseodymium, neodymium, promethium, samarium, europium, gadolinium, terbium, dysprosium, holmium, erbium, thulium, ytterbium and lutetium) or mixtures of their oxides. For this purpose, 0.5 to 20, preferably 5 to 10 wt. % of the particular oxide or oxide mixture is required. The concentration data cited here refer to the total weight of support material. Doping may be performed using one of the methods already described for doping cerium oxide.

The support materials based on cerium oxide are particularly advantageous for preparing storage materials which are intended to be used in exhaust gases which contain sulfur dioxide. Sulfur dioxide reacts, after oxidation to sulfur trioxide, with barium oxide in competition with nitrogen dioxide to give barium sulfate. Barium sulfate is substantially more thermally stable than barium nitrate and therefore continuously reduces the storage capacity of storage materials. The storage material must therefore be periodically desulfatised. For this purpose, the engine is operated with a less than stoichiometric air fuel mixture ($\lambda<0.98$) and the exhaust gas temperature is raised. To desulfatise conventional storage material, barium oxide on aluminum oxide ($BaO/Al_2O_3$), temperatures of more than 650° C. are required. It has now been found that cerium oxide obviously exerts a promoting effect on the desulfatisation of barium oxide when it is used as a support material for barium oxide and thus comes into direct contact with the barium sulfate produced. Desulfatisation of storage materials according to the invention, barium oxide on cerium oxide ($BaO/CeO_2$), takes place at only 550° C. This is advantageous due to the associated saving in fuel.

To prepare the storage material according to the invention, the storage components are incorporated in or applied to the support material in a suitable manner. In this case the techniques of co-precipitation, co-thermal hydrolysis, impregnation and precipitation already described for the doping of cerium oxide may be used. The materials are preferably prepared by impregnating the support material with soluble precursors of the storage components then drying and calcination at temperatures of 300 to 800° C., wherein the precursors are converted into the actual oxidic storage components. After cooling to room temperature the storage components react with carbon dioxide and moisture in the air so that, as described above, they are present to some extent as carbonate or hydroxide.

According to the invention care must be exercised that the chosen material pair support/storage component does not tend to form mixed oxides. This is also true for co-precipitation and co-thermal hydrolysis. In these two cases the missing ability to form mixed oxides leads to the formation of domains which consist essentially of support material and domains which consist essentially of the storage component.

The calcination of the impregnated support material is an important step in the manufacturing of the storage material. The manner of calcination essentially influences the size of the particles or of the above mentioned domains of the forming barium oxide or barium carbonate particles. This particle size should be less than 1.5, preferably less than 1 μm to provide a sufficiently large surface area for contact of the storage components with the exhaust gas. A small particle size also improves the dynamic behaviour of storage and desorption of nitrogen oxides and sulphur oxides because the reactants have only to diffuse over small distances within the particles of the storage components. Therefore storage of nitrogen oxides in small storage particles is able to cope with changing exhaust gas compositions due to quick changes of engine load.

For restricting the particle size of the storage components to values below 1 to 1.5 μm temperature and duration of the calcination have to be chosen appropriately. Particle sizes of below 1 μm temperature and duration of the calcination have to be chosen appropriately. Particle sizes of below 1 μm can be obtained with a temperature of calcination of 500° C. for a period of 2 hours. The particle sizes of the storage particles can be checked by using a transmission electron microscope or by evaluating the width of the diffraction peaks of a X-ray diffraction analysis.

Water-soluble compounds are used as precursors or precursor compounds of the storage components, such as for example acetates, nitrates, nitrites, chlorides, hydroxides etc. Acetates are preferred because it has been proven that acetates promote the formation of small particles of the storage components.

The doping elements for stabilizing the support material may also be added to the impregnation solution comprising the precursors of the storage components in the form of the soluble precursors so that doping with the doping elements and coating with the storage components can take place in one working process.

The storage components may be precipitated in such a way that a solution of water soluble compounds of the storage components is added to the support material and this is deposited onto the carrier material by adding a precipitating reagent. Suitable precipitating reagents for the anions of strontium and barium are ammonium carbonate and ammonium oxalate.

The storage material can be used to make nitrogen oxide stores. These are inert honeycomb structures made of metal or ceramic whose flow channels are coated with the storage material. To coat the honeycomb structures, the powdered storage material is worked up to give an aqueous coating dispersion and applied to the honeycomb structure using known coating procedures, then dried and calcined.

When preparing these types of nitrogen oxide stores the storage material may also be prepared "in situ", that is to say the untreated support material is used to produce an aqueous coating dispersion. The storage components and stabilizing components are added to these coating dispersions in the form of their soluble precursors. The honeycomb structure is then coated with this coating dispersion, the coating is dried and then calcined. Production of the storage material therefore takes place only in the coating on the honeycomb structure. A calcination step is saved by using this procedure.

Alternatively, a coating dispersion may also be made up which contains only the support material. The honeycomb structures are coated with this dispersion, dried and calcined. Then the coated honeycomb structure is coated by impregnating with the soluble precursors of the storage components and optionally the doping elements, dried and calcined. In this case also the storage material is produced only in the coating on the honeycomb structure. Any combination of the methods of preparation described may also be used.

The storage material according to the invention can be combined particularly advantageously with conventional storage materials. Thus a considerable improvement in the thermal stability of the nitrogen oxide store can be obtained when the storage material is mixed, for example, with a material which contains a storage component on a known support material, for example barium oxide on γ-aluminum oxide (active aluminum oxide). The "in situ" methods of preparation described above can also be applied to this type of mixed storage material in any combination.

The storage material according to the invention is preferably processed to give a nitrogen oxide storing catalyst which consist of an inert honeycomb structure whose flow channels are coated with the catalyst material. The catalyst material consists of the storage material and catalytically active metal components. The catalytically active components may be present on the storage material itself or on a separate support material, preferably aluminum oxide. A stabilized aluminum oxide is preferably used for this purpose. The aluminum oxide is frequently doped with lanthanum or barium for stabilization purposes. These types of materials are commercially available.

When preparing nitrogen oxide storing catalysts a variety of "in situ" techniques may also be used in which the storage If material is formed only during final calcination of the coated honeycomb structure.

Some of the methods of preparation mentioned are described in the following examples and comparison examples.

Preliminary Trial

Different support materials were tested for their tendency to react with nitrogen oxide storage components during calcination for a period of 24 hours at 850° C. in air.

Potassium oxide and barium oxide were chosen as nitrogen oxide storage components and each were deposited onto the support materials by impregnation. 20 g of barium or 20 g of potassium oxide were applied to each 100 g of support material.

The calcined storage materials were tested using X-ray diffraction (XRD) for the suspected production of mixed oxides from the particular support material and the storage components. The results are given in Table 1.

Table 1 contains, in addition to the names of the support material tested, its BET surface area in the fresh state and its composition. The mixed oxide which could be produced is mentioned in the "mixed oxide" column. The "greatest reflection" and "second greatest reflection" columns contain the angle of diffraction for the two most significant reflections from the possibly produced mixed oxide. The intensities of the reflections are given qualitatively in each of the adjacent columns. For the purposes of the invention, suitable support materials are those which have only a low tendency to react with the storage components. This is the case if the reflections are either not detectable or have an intensity which is only "weak" to "moderate". Barium titanate, as a special case, is already a mixed oxide of barium oxide and titanium oxide and therefore experiences no modification during calcination.

As can be seen from Table 1, the conventional support materials zirconium oxide, titanium oxide, aluminum oxide and magnesium/aluminum spinel ($MgAl_2O_4$), under the chosen ageing conditions, exhibit strong mixed oxide production with barium oxide and potassium oxide. Magnesium oxide does not form a mixed oxide with barium oxide. In the case of cerium oxide the production of the theoretically possible barium cerate ($BaCeO_3$) was not observed. The cerium/zirconium mixed oxide had a tendency to produce barium zirconate with increasing concentration of zirconium oxide. Up to a concentration of about 30 wt. % of zirconium oxide in the cerium/zirconium mixed oxide, however, the mixed oxide production is tolerable. Zirconium silicate also exhibits no reaction with the storage components.

According to the invention a support material which is suitable for nitrogen oxide storage components should have only a low tendency to produce mixed oxides with the storage components, adequate stability of its specific surface area under the reducing and oxidizing exhaust gas conditions of an internal combustion engine and should also have a specific surface area of more than 10 $m^2/g$.

Although cerium oxide satisfies the first and third conditions completely, it is less suitable as a support material for the storage components because its specific surface area has only a low stability under reducing exhaust gas conditions, such as for example in the high load regions of lean running gasoline engines. In the case of zirconium silicate, although there is no mixed oxide production with the storage component, its specific surface area in the fresh state is too low to take up an adequate amount of storage components in highly dispersed form. This applies to the particular modification of zirconium silicate used. By using a specially designed method of preparation for zirconium silicate, however, it may also be possible to prepare this material with a much larger surface area in the fresh state. In this case it would also be suitable for use as a support material for the storage material according to the invention.

same support particles and were thus directly in contact with each other. The tests show that the advantages of the storage materials according to the invention were obvious in both cases and did not depend, for example, on the position of the noble metal with respect to the storage components.

The nitrogen oxide storing catalysts were aged on an engine test bed for 50 hours each using an engine with a 2 liter capacity. The maximum temperature at the entrance to the catalyst was adjusted to 750° C. Due to the exothermic reaction on the particular catalyst the catalyst bed temperature increased to about 830° C. Ageing was performed under reducing exhaust gas conditions with a normalized air to fuel ratio $\lambda=0.97$ with periodic fuel cut-offs every 120 seconds for 5 seconds each. During the fuel cut-off the air to fuel ratio changed suddenly from 0.97 to a value well above 1.

The nitrogen oxide storage efficiency of the catalysts was determined on a synthesis gas unit. Here, the storing catalysts were operated with a so-called rich/lean cycle in which the catalysts were subjected periodically to lean and then rich exhaust gas at a specific temperature. Lean exhaust gas compositions were produced by adding oxygen and simultaneously reducing carbon monoxide and hydrogen concentrations. Rich exhaust gas compositions were produced by the reverse procedure.

In the lean phase, the nitrogen oxides were stored by the particular catalyst. During the rich phase desorption occurred and the nitrogen oxides reacted on the catalyst to give nitrogen while consuming the reducing components carbon monoxide, hydrogen and hydrocarbons in the exhaust gas.

TABLE 1

Support materials tested and their tendency to produce mixed oxides with the storage components

| Support material | BET surface area [$m^2/g$] | Composition [wt. %] | Mixed oxide | Greatest reflection 2 theta | Intensity of greatest reflection | Second greatest reflection 2 theta | Intensity of second greatest reflection |
|---|---|---|---|---|---|---|---|
| Magnesium oxide | 59 | >99 MgO | — | — | — | — | — |
| Cerium oxide | 184 | >99 $CeO_2$ | $BaCeO_3$ | 28.59 | not detectable | 41.09 | not detectable |
|  |  |  | $K_2CeO_3$ | 29.76 | not detectable | 34.48 | not detectable |
| Cerium/silicon oxide | 220 | 99 $CeO_2$/1 $SiO_2$ | $BaCeO_3$ | 28.59 | not detectable | 41.09 | not detectable |
|  |  |  | $K_2CeO_3$ | 29.76 | not detectable | 34.48 | not detectable |
| Cerium/zirconium oxide | 87 | 90 $CeO_2$/10 $ZrO_2$ | $BaZrO_3$ | 30.12 | weak | 53.49 | weak |
| Cerium/zirconium oxide | 152 | 70 $CeO_2$/30 $ZrO_2$ | $BaZrO_3$ | 30.12 | moderate | 53.49 | moderate |
| Cerium/zirconium oxide | 128 | 93 $CeO_2$/7 $ZrO_2$ | $BaZrO_3$ | 30.12 | weak | 53.49 | weak |
| Zirconium silicate | 4 | >99 $ZrSiO_4$ | $BaZrO_3$ | 30.12 | weak | 53.49 | weak |
| Yttrium oxide | 14 | >99 $Y_2O_3$ | — | — | — | — | — |
| Cerium/praseodymium oxide | 151 | 88 $CeO_2$/12 $Pr_6O_{11}$ | $BaCeO_3$ | 28.59 | weak | 41.09 | weak |
| Cerium/Neodymium oxide | 162 | 91 $CeO_2$/9 $Nd_2O_3$ | $BaCeO_3$ | 28.59 | weak | 41.09 | weak |
| Barium titanate | 24 | >99 $BaTiO_3$ | $BaTiO_3$ | 31.57 | no change | 38.89 | no change |
| Zirconium oxide | 33 | >98 $ZrO_2$ | $BaZrO_3$ | 30.12 | strong | 53.49 | strong |
|  |  |  | $K_4Zr_{11}O_{24}$ | 31.21 | strong | 44.32 | strong |
| Titanium oxide | 78 | >98 $TiO_2$ | $BaTiO_3$ | 31.57 | strong | 38.89 | strong |
|  |  |  | $K_2Ti_6O_{13}$ | 11.48 | strong | 29.26 | strong |
| Aluminium oxide | 189 | >98 $Al_2O_3$ | $BaAl_2O_4$ | 28.28 | strong | 34.32 | moderate |
| Aluminium silicate | 300 | 95 $Al_2O_3$/5 $SiO_2$ | $BaAl_2O_4$ | 28.28 | strong | 34.32 | moderate |
| Mg spinel | 142 | 31 MgO/69 $Al_2O_3$ | $BaAl_2O_4$ | 28.28 | strong | 34.32 | strong |

$NO_x$ Storing Catalysts and Their $NO_x$ Storage Efficiency

In the following examples various nitrogen oxide storing catalysts were prepared using storage materials according to the invention and their nitrogen oxide storage efficiency was compared with storing catalysts not according to the invention.

The storage efficiency was determined for fresh and aged catalysts. When preparing the catalysts, in some cases the noble metal component and the storage components were deposited onto separate support particles and introduced into the catalyst formulation in that form. In other cases, the noble metal and storage components were deposited onto the FIG. 1 shows this behaviour in an idealised manner. During the measurements the exhaust gas had a constant concentration of 500 vppm (volume ppm) of nitrogen monoxide (NO). The nitrogen oxide concentration entering the storing catalyst ($NO_x$In) is therefore shown by the dotted straight line in FIG. 1. The nitrogen oxide concentration downstream of the storing catalyst ($NO_x$Out) is initially zero because the fresh storing catalyst binds all of the nitrogen oxides contained in the exhaust gas in the ideal situation.

With increasing time, the storing catalyst becomes loaded with nitrogen oxides and its storage capacity is reduced. Thus increasingly smaller amounts of nitrogen oxides are bonded on the storing catalyst so that downstream of the catalyst an increase in concentration of nitrogen oxide could be measured which was approximately equal to the initial concentration after complete saturation of the storing catalyst with nitrogen oxides.

Therefore after a certain period of time (in FIG. 1 after 80 seconds) regeneration of the storing catalyst must be initiated. This takes place by enriching the exhaust gas for a period of about 20 seconds. This causes the stored nitrogen oxides to desorb and in the ideal case these react completely on the storing catalyst so that no nitrogen oxides can be measured downstream of the storing catalyst during the regeneration time. Afterwards lean exhaust gas is passed through the system again and the storage of nitrogen oxides starts all over again.

The instantaneous storage efficiency of the storing catalyst is defined by the ratio $$S = \frac{NO_xIn - NO_xOut}{NO_xIn}.$$

As can be seen from FIG. 1 this efficiency is time-dependent. To assess the storing catalysts, therefore, the storage efficiency S is integrated over the particular storage phase and averaged over 8 storage cycles in sequence:

$$S = \frac{1}{8}\sum_{1}^{8}\int_{t=0}^{80}\frac{NO_xIn - NO_xOut}{NO_xIn}dt \times 100\,[\%].$$

The efficiency of storage S is therefore not a material constant but depends on the parameters of the particular rich/lean cycle. To assess the storing catalysts prepared, the following conditions were selected:

Parameters for the Rich/Lean Cycle
  Space velocity: 50,000 h$^{-1}$
  Temperature range: 150–500° C. in steps of 50° C.
  Number of rich/lean cycles: 8 per temperature step
  Duration of lean phase: 80 seconds
  Duration of rich phase: 20 seconds Composition of the exhaust gas

| During the lean phase | | during the rich phase | |
| --- | --- | --- | --- |
| Gas component | Concentration | Gas component | Concentration |
| NO | 500 vppm | NO | 500 vppm |
| CO$_2$ | 10.0 vol. % | CO$_2$ | 10.0 vol. % |
| H$_2$O | 10.0 vol. % | H$_2$O | 10.0 vol. % |
| C$_3$H$_6$ | 50 vppm | C$_3$H$_6$ | 50 vppm |
| O$_2$ | 8.0 Vol. % | O$_2$ | 0.2 Vol. % |
| CO | 0.0 Vol. % | CO | 4.0 Vol. % |
| H$_2$ | 0.0 Vol. % | H$_2$ | 1,3 Vol. % |

In FIGS. 2 to 18, the storage efficiencies for different storing catalysts determined in this way are plotted against the exhaust gas temperature.

EXAMPLE 1

In this example, a nitrogen oxide storing catalyst was prepared by first making up a nitrogen oxide storage material according to the invention and two catalyst powders. The three powdered materials were then processed to form one catalyst.

To prepare the storage material, 550 g of a cerium/zirconium mixed oxide (90 wt. % cerium oxide and 10 wt. % zirconium oxide) with a BET surface area in the freshly calcined state of 87 m$^2$/g was coated with 100 g of barium oxide by impregnating with aqueous barium acetate solution, then drying and calcining at 500° C. in air. The duration of the calcination process was 2 hours. As a result of calcining, the soluble barium acetate was fixed on the support material in the form of barium oxide and/or barium carbonate. This ensured that the barium acetate did not go into solution again during the subsequent preparation steps.

The size of the formed barium oxide particles or barium carbonate particles respectively was investigated with the aid of a transmission electron microscope. The mean particle size was less than 1 μm.

To make up a platinum/aluminum oxide powder, 15 g of platinum were deposited on 700 g of aluminum oxide with a BET surface area in the freshly calcined state of 210 m$^2$/g by impregnating with an aqueous solution of platinum tetraamminonitrate and then drying and calcining at 500° C. in air.

To make up a rhodium/aluminum oxide powder, 1.5 g of rhodium were deposited on to 100 g of aluminum oxide with a BET surface area in the freshly calcined state of 142 m$^2$/g by impregnating with an aqueous rhodium nitrate solution and then drying and calcining at 500° C.

The three powders prepared in this way were stirred into an aqueous dispersion and milled to a particle size of 3 to 5 μm (d$_{50}$). The oxidic solids from the dispersion were applied by means of an immersion process on commercially available honeycomb structures made of cordierite.

The honeycomb structure coated in this way was dried at 120° C. in a drying cabinet. The immersion and drying stages were repeated until a loading of 230 g of oxidic matter per liter of honeycomb structure volume was achieved. Then the coated honeycomb structure was calcined for 4 hours at 500° C. The final catalyst thus contained 15.9 g/l of barium oxide, 87.2 g/l of cerium/zirconium mixed oxide, 126.9 g/l of aluminum oxide, 2.4 g/l of platinum and 0.24 g/l of rhodium.

Comparison Example 1

A catalyst was made up in the same way described in example 1 but barium oxide was not used on the cerium/zirconium mixed oxide used in example 1 (with 90 wt. % of CeO$_2$) but on γ-aluminum oxide with a BET surface area of 142 m$^2$/g.

Comparison Example 2

Another catalyst was made up in the same way as described in example 1 but barium oxide was not applied to the cerium/zirconium mixed oxide used in example 1 (with 90 wt. % of CeO$_2$) but on titanium oxide with a BET surface area of 78 m$^2$/g.

Comparison Example 3

Another catalyst was made up in the same way as described in example 1 but barium oxide was not applied to the cerium/zirconium mixed oxide (with 90 wt. % of CeO$_2$) used in example 1 but on cerium/zirconium mixed oxide with 30 wt. % of zirconium oxide and a BET surface of 152 m$^2$/g.

Comparison Example 4

Another catalyst was made up in the same way as described in example 1 but barium oxide was not applied to the cerium/zirconium mixed oxide (with 90 wt. % of $CeO_2$) used in example 1 but on a pure cerium oxide with a BET surface area of 184 $m^2$/g.

EXAMPLE 2

A catalyst from example 1 was loaded with an additional 15 g of praseodymium oxide per liter of honeycomb structure volume by impregnating with an aqueous solution of praseodymium acetate, drying and then calcining.

EXAMPLE 3

Another catalyst from example 1 was loaded with an additional 15 g of neodymium oxide per liter of honeycomb structure volume by impregnating with an aqueous solution of neodymium nitrate, drying and then calcining.

EXAMPLE 4

Magnesium oxide with a BET surface area of 59 $m^2$/g was used instead of the cerium/zirconium mixed oxide used in example 1.

EXAMPLE 5

A catalyst from example 4 was loaded with another 8 g of barium oxide per liter of honeycomb structure volume by impregnating with an aqueous solution of barium acetate, drying and then calcining.

EXAMPLE 6

A storage material according to the invention was obtained by co-precipitation of magnesium oxide as support material and barium oxide as storage component in the following way:

An aqueous solution of $MgCl_2$ (13.8 mole) and $BaCl_2$ (0.65 mole) was introduced dropwise from a burette into 9.8 l of an ammonia solution. The ammonia solution was stirred vigorously and held at a constant pH of 11.0 and a temperature of 60° C. The precipitate produced was filtered off, washed with demineralized water, dried at 120° C. in air and calcined for 4 hours at 600° C.

The BaO/MgO powder obtained in this way was incorporated into a complete catalyst formulation in the same way as the storage material prepared in example 1 (barium oxide on cerium/zirconium mixed oxide).

EXAMPLE 7

Another storage material according to the invention was obtained by co-precipitation of magnesium oxide as support material and barium oxide as storage component in the following way:

An aqueous solution of $MgCl_2$ (13.8 mole) and $BaCl_2$ (0.65 mole) was added dropwise from a burette into 9.8 l of a 1.5 molar sodium carbonate solution. The sodium carbonate solution was stirred vigorously and held at a constant temperature of 60° C. The precipitate produced was filtered off, washed with demineralized water, dried in air at 120° C. and calcined for 4 hours at 600° C.

The BaO/MgO powder obtained in this way was incorporated into a complete catalyst formulation in the same way as the storage material prepared in example 1 (barium oxide on cerium/zirconium mixed oxide).

EXAMPLE 8

Another storage material according to the invention was obtained by co-precipitation of praseodymium oxide as support material and barium oxide as storage component in the following way:

An aqueous solution of $Pr(NO_3)_3$ (3.2 mole) and $Ba(NO_3)_2$ (0.65 mole) was added dropwise from a burette to 19.2 l of a 0.5 molar $(NH_4)_2C_2O_4$ solution. The $(NH_4)_2C_2O_4$ solution was stirred vigorously and held at a constant temperature of 60° C. The pH was held at 6.6 by simultaneous addition of an ammonia solution. The precipitate produced was filtered off, washed in demineralized water, dried in air at 120° C. and calcined for 4 hours at 600° C.

The $BaO/Pr_6O_{11}$ powder obtained in this way was incorporated into a complete catalyst formulation in the same way as the storage material prepared in example 1 (barium oxide on cerium/zirconium mixed oxide).

EXAMPLE 9

Another storage material according to the invention was obtained by co-precipitation of cerium oxide and praseodymium oxide as support material and barium oxide as storage component in the following way:

An aqueous solution of $Ce(NO_3)_4$ (2.8 mole), $Pr(NO_3)_3$ (0.4 mole) and $Ba(NO_3)_2$ (0.65 mole) was added dropwise from a burette to 19.2 l of a 0.5 molar $(NH_4)_2C_2O_4$ solution. The $(NH_4)_2C_2O_4$ solution was stirred vigorously and held at a constant temperature of 60° C. The pH was held at 6.6 by simultaneous addition of an ammonia solution. The precipitate was filtered off, washed in demineralized water, dried at 120° C. in air and calcined for 4 hours at 600° C.

The $BaO/CeO_x/PrO_y$ powder obtained in this way was incorporated into a complete catalyst formulation in the same way as the storage material prepared in example 1 (barium oxide on cerium/zirconium mixed oxide).

EXAMPLE 10

A cerium oxide stabilized by precipitation with 12 wt. % praseodymium oxide was used instead of the cerium/zirconium mixed oxide used in example 1. The stabilized cerium oxide had a BET surface area of 151 $m^2$/g.

EXAMPLE 11

A cerium oxide stabilized by precipitation with 9 wt. % of neodymium oxide was used instead of the cerium/zirconium mixed oxide used in Example 1. The stabilized cerium oxide had a BET surface area of 162 $m^2$/g.

EXAMPLE 12

The cerium oxide stabilized with praseodymium oxide prepared in example 10 was used as support material for the storage component. Differently from example 10, the stabilized cerium oxide was not impregnated with barium oxide but with the same weight of strontium oxide as storage component.

EXAMPLE 13

The final catalyst from example 10 was loaded with a further 8 g of barium oxide per litre of honeycomb structure volume by impregnating with an aqueous solution of barium acetate, drying and then calcining.

EXAMPLE 14

A cerium oxide stabilized with 1 wt. % of silicon oxide and with a BET surface area of 219 $m^2$/g was used instead of the cerium/zirconium mixed oxide used in example 1.

EXAMPLE 15

The $NO_x$ storage material was initially prepared in the same way as in example 14. In addition, however, another 6 wt. % of calcium oxide was applied to the cerium oxide stabilized with silicon oxide by post-impregnating with aqueous calcium nitrate solution, drying and calcining.

EXAMPLE 16

The catalyst was made up in accordance with the weight data given in example 1, but the preparation was modified. First of all a dispersion of the three powders described in example 1, that is Pt-aluminum monoxide, Rh-aluminum oxide and untreated cerium/zirconium mixed oxide (90 wt. % of cerium oxide and 10 wt. % of zirconium oxide), was prepared. After milling the dispersion, a honeycomb structure made of cordierite was coated therewith. After drying the coating in air at 300° C., the honeycomb structure had a coating concentration of 210 g/l of honeycomb structure. Then the catalyst was loaded with 25 g of barium oxide by impregnating with an aqueous barium acetate solution, drying and calcining for 4 hours in air at 500° C.

In this example the concentration of barium oxide in the storage component, as compared with all the other examples, was increased from 16 g/l to 25 g/l. Due to the method of preparation chosen for this example, not only was the support material cerium/zirconium mixed oxide used according to the invention coated with barium oxide, but also the two catalyst powders (Pt-$Al_2O_3$ and Rh-$Al_2O_3$). In order to provide approximate compensation for this the concentration of barium oxide on the storing catalyst was increased.

EXAMPLE 17

Another catalyst was made up in the same way as described in example 1. Differently from example 1 however the storage material was not prepared by impregnating the cerium/zirconium mixed oxide with barium acetate but by using a precipitation reaction with ammonium carbonate. For this purpose 550 g of cerium/zirconium mixed oxide (90 wt. % of cerium oxide and 10 wt. % of zirconium oxide) were dispersed in 700 ml of water and 166 g of barium acetate, corresponding to 100 g of barium oxide were added thereto. With continuous stirring, a solution of 63 g of ammonium carbonate in 300 ml of water was added dropwise slowly to the dispersion. Barium then precipitated onto the support material in the form of insoluble barium carbonate. Then the dispersion was further processed by adding 715 g of platinum/aluminum oxide powder and 101.5 g of rhodium/aluminum oxide powder as described in example 1, that is it was milled, coated and calcined.

This method of preparation has the advantage over the process described in example 1 that calcination of the storage material in order to convert barium acetate into barium oxide can be omitted. Barium is fixed directly on to the storage material as barium carbonate during precipitation.

EXAMPLE 18

Another catalyst was prepared in the same way as described in example 17. An aqueous solution of 81 g of ammonium oxalate in 1800 ml of water was used as precipitating reagent in this example.

As shown in the diagrams in FIGS. 1 to 16, the catalysts in the comparison examples 1 to 4 have approximately the same fresh activity as the catalysts according to the invention. After ageing, the storage efficiency of the comparison catalysts, in particular in the temperature range from 200 to 350° C., decreases substantially more than in the case of catalysts according to the invention. The reduction in storage efficiency due to ageing is generally around 40 to 50% for the comparison catalysts, while the reduction in efficiency of the catalysts according to the invention is only 10 to 25%.

EXAMPLE 19

Another catalyst was prepared in the same way as described in example 1. Differently from example 1 however the support material for the storage component was selected from a mixed oxide consisting of 90 wt.-% of cerium oxide and 10 wt.-% of praseodymium oxide. This mixed oxide material had been prepared by co-precipitation of cerium oxide and praseodymium oxide precursors. This support material had a specific surface area of 140 $m^2/g$.

Figure 17:
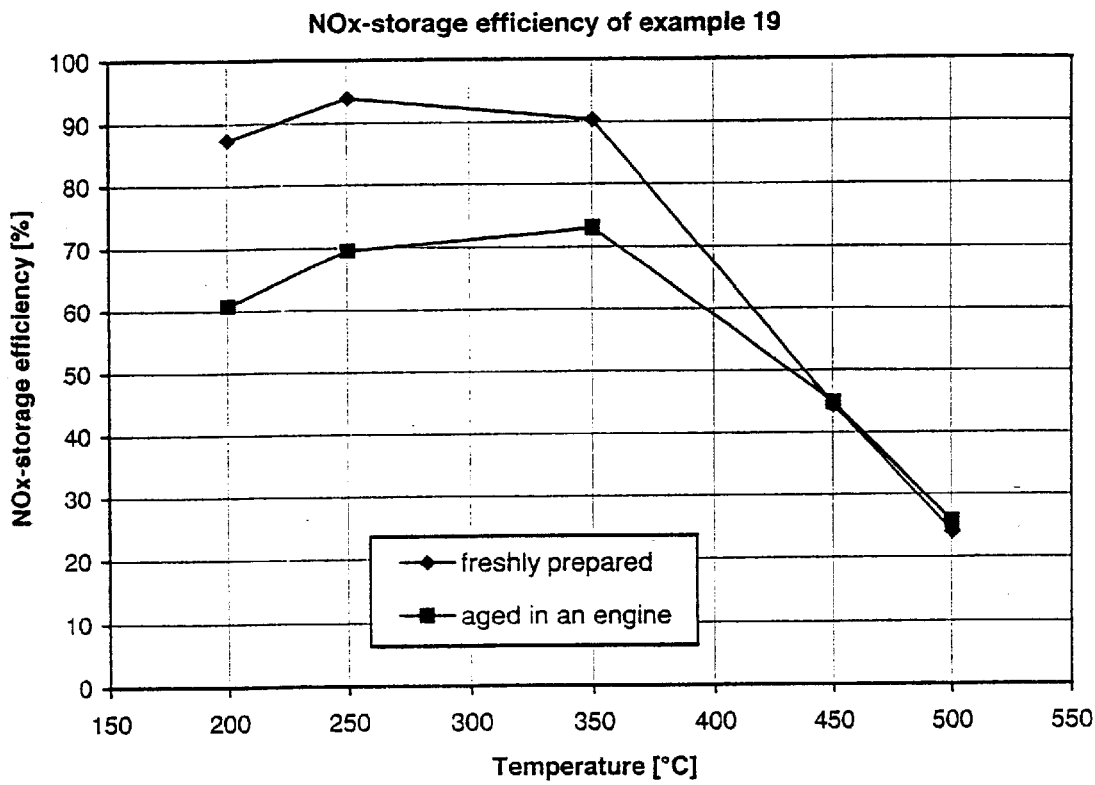

The nitrogen oxides storage efficiency of this storage material is shown in FIG. 17 for the freshly prepared and engine aged catalyst over the exhaust gas temperature.

The nitrogen oxides storage efficiency of this storage material is shown in FIG. 17 for the freshly prepared and engine aged catalyst over the exhaust gas temperature.

Comparison Example 5

Another catalyst was prepared in the same way as described in example 1. The storage material was prepared in accordance with the disclosure of DE 197 13 432 A1 for the catalytic base material. The support material was selected from pure cerium oxide with a specific surface area of 100 $m^2/g$. After impregnation with barium acetate the material was dried and then calcined as described in example 1 of DE 197 13 432 A1 at a temperature of 900° C. for a period of 24 hours.

Figure 18:
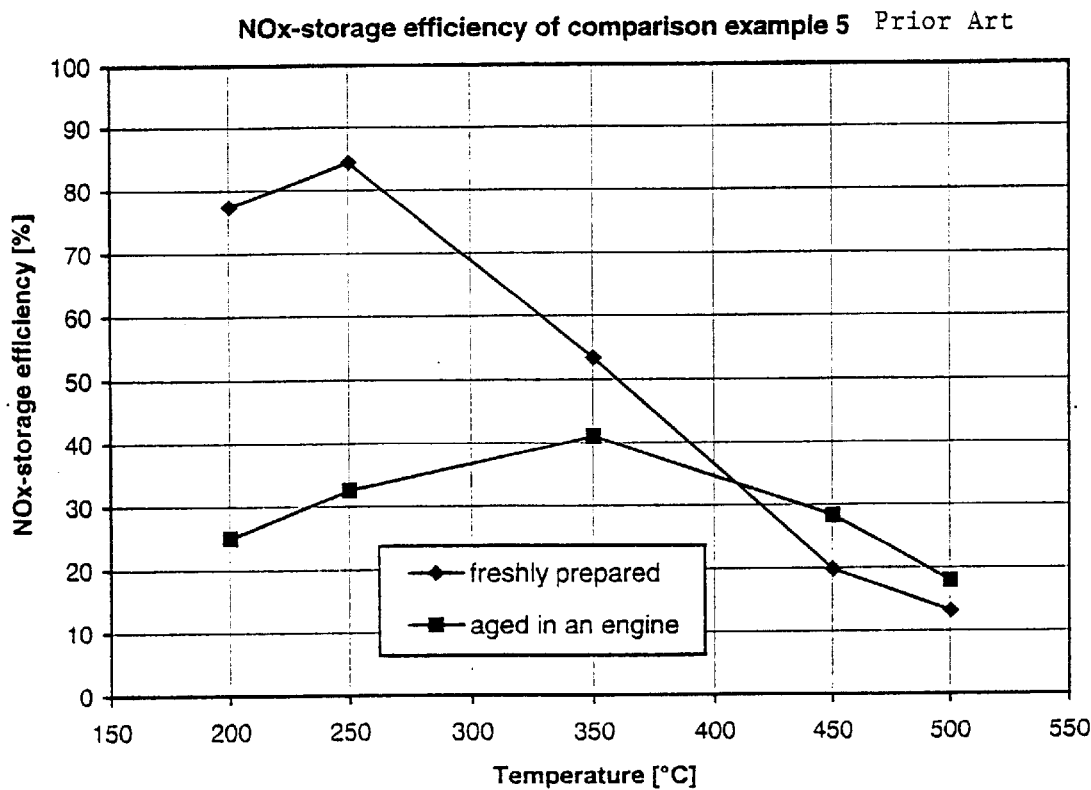

The nitrogen oxides storage efficiency of this storage material is shown in FIG. 18 for the freshly prepared and engine aged catalyst over the exhaust gas temperature.

FIG. 18 demonstrates that the catalytic base material according to DE 197 13 432A1 has a low temperature stability under the above described ageing conditions in the exhaust gas of a combustion engine. The fresh storage material exhibits a storage efficiency below 250° C. which is already lower than of the storage material according to the invention. Above 250° C. the storage efficiency decreases rapidly.

This rapid decrease of the storage efficiency at higher temperatures probably is due to the large barium oxide particles which form during calcination at 900° C. for the period of 2 hours. Obviously the large particles worsen the dynamic properties of the storage process. At temperatures above 250° C. the equilibrium between nitrogen dioxide and nitrogen monoxide shifts to nitrogen monoxide. Therefore, a good storage efficiency can only be obtained at higher temperatures if nitrogen dioxide generated by the catalyst is quickly removed from the equilibrium between both nitrogen oxides by reaction with the storage components. But large barium oxide particles are not able to perform this task.

Further variations and modifications of the foregoing will be apparent to those skilled in the art and are intended to be encompassed by the claims appended hereto.

German priority application 198 38 282.0 is relied on and incorporated herein by reference.

We claim:

1. A nitrogen oxide storage material, comprising:
   at least one storage component for nitrogen oxides selected from the group consisting of particles of an oxide, carbonate and hydroxide of magnesium, calcium, strontium, barium, potassium or cesium, the particles having a mean particle diameter of less than 1 µm; and a support material, on which the storage component is provided, the support material being a member selected from the group consisting of doped cerium oxide, cerium/zirconium mixed oxide, calcium titanate, strontium titanate, barium titanate, barium stannate, barium zirconate, magnesium oxide, lanthanum oxide, praseodymium oxide, samarium oxide, neodymium oxide, yttrium oxide, and mixtures thereof.

2. The nitrogen oxide storage material as claimed in claim 1, wherein the support material comprises a doped cerium oxide which has been doped with 0.5 to 20 wt. % of at least one oxide of an element selected from the group consisting of silicon, scandium, yttrium, the rare earth metals, and mixtures thereof, with respect to the total weight of storage material.

3. The nitrogen oxide storage material as claimed in claim 2, wherein the cerium oxide has been doped by co-precipitation, co-thermal hydrolysis, impregnation or precipitation.

4. The nitrogen oxide storage material as claimed in claim 1, wherein the support material comprises a cerium/zirconium mixed oxide with a zirconium oxide content of 1 to 25 wt. %, with respect to the total weight of mixed oxide.

5. The nitrogen oxide storage material as claimed in claim 1, wherein the cerium/zirconium mixed oxide has been doped with 0.5 to 20 wt. % of at least one oxide of an element selected from the group consisting of silicon, scandium, yttrium, or rare earth metals, and mixtures thereof, with respect to the total weight of storage material.

6. The nitrogen oxide storage material as claimed in claim 5, wherein the cerium/zirconium mixed oxide has been doped by co-precipitation, co-thermal hydrolysis, impregnation or precipitation.

7. The nitrogen oxide storage material as claimed in claim 1, which contains 10 to 45 wt. % of the storage component, with respect to the total weight of storage material.

8. The nitrogen oxide storage material as claimed in claim 1, wherein the support material on which the storage material is provided has a specific surface area of at least $10\,m^2/g$.

9. A process for preparing the storage material as claimed in claim 1, comprising depositing a storage component onto a support material by impregnating the support material with a water-soluble precursor compound of the storage component, and then drying and calcining, wherein the temperature and duration of calcining is such that the size of the particles of the storage components is less than 1 µm.

10. The process for preparing the storage material as claimed in claim 1, comprising precipitating a storage component onto the support material present in an aqueous dispersion using a precipitation reagent, drying and calcining, wherein the temperature and duration of calcining is such that the size of the particles of the storage components is less than 1 µm.

11. A process for preparing the storage material as claimed in claim 1, comprising co-precipitating a storage material from an aqueous solution of a precursor compound of the support material and the storage component, and then drying and calcining, whereby temperature and duration of calcining is such that the size of the particles of the storage components is less than 1 µm.

12. The nitrogen oxide storage material according to claim 1, wherein the storage component for nitrogen oxides comprises barium oxide.

13. A nitrogen oxide storage material comprising an inert honeycomb structure, made of ceramic or metal, coated with the storage material of claim 1.

14. The nitrogen oxide storage material as claimed in claim 13, wherein the coating contains additional storage components on aluminum oxide or stabilized aluminum oxide.

15. A process for treating exhaust gas from a lean operating internal combustion engine which periodically alternates from a lean operation to a rich operation, wherein the nitrogen oxides contained in the exhaust gas are stored by the nitrogen oxide storage material as claimed in claim 12 under lean exhaust gas conditions, and are released under rich exhaust gas conditions.

16. A nitrogen oxide storage catalyst, in the form of a coating on an inert support structure, comprising the nitrogen oxide storage material according to claim 1, and at least one member of the platinum group metals selected from the group consisting of platinum, palladium, rhodium, iridium and mixtures thereof.

17. The nitrogen oxide storage catalyst as claimed in claim 16, which further comprises aluminum oxide or stabilized aluminum oxide, and at least one oxygen storing material comprising cerium oxide.

18. The nitrogen oxide storage catalyst as claimed in claim 17, wherein the platinum group metal is deposited on the aluminum oxide or the stabilized aluminum oxide.

19. The nitrogen oxide storage catalyst as claimed in claim 18, wherein storage components are also deposited on the aluminum oxide or the stabilized aluminum oxide, and on the oxygen storing material.

20. A process for the removal of nitrogen oxides from a nitrogen oxides storage catalyst of a lean operating internal combustion engine, comprising periodically alternating from a lean mode of operation to a rich mode of operation, wherein the nitrogen oxides are stored by the nitrogen oxide storage catalyst as claimed in claim 15 under lean operating conditions, and are released under rich exhaust gas conditions and are largely reduced to nitrogen on the catalytically active components, with the assistance of components contained in the exhaust gas.

21. A nitrogen oxide storage material, comprising:

at least one storage component for nitrogen oxides selected from the group consisting of particles of an oxide, carbonate and hydroxide of magnesium, calcium, strontium, barium, potassium or cesium, the particles having a mean particle diameter of less than 1 µm; and a support material, on which the storage component is provided, consisting of doped cerium oxide, which has been doped with 0.5 to 20 wt. % of at least one oxide of an element selected from the group consisting of silicon, scandium, yttrium, the rare earth metals, and mixtures thereof, with respect to the total weight of storage material.

22. The nitrogen oxide storage material according to claim 21, wherein the storage component for nitrogen oxides comprises barium oxide.

23. A nitrogen oxide storage material, comprising:

at least one storage component for nitrogen oxides selected from the group consisting of particles of an oxide, carbonate and hydroxide of magnesium, calcium, strontium, barium, potassium or cesium, the particles having a mean particle diameter of less than 1 µm; and a support material, on which the storage component is provided, consisting of a cerium/zirconium mixed oxide having a zirconium oxide content of from 1 to 25 wt. %, with respect to the total weight of the mixed oxide.

24. The nitrogen oxide storage material according to claim 23, wherein the storage component for nitrogen oxides comprises barium oxide.

* * * * *